US006859114B2

(12) United States Patent
Eleftheriades et al.

(10) Patent No.: US 6,859,114 B2
(45) Date of Patent: Feb. 22, 2005

(54) METAMATERIALS FOR CONTROLLING AND GUIDING ELECTROMAGNETIC RADIATION AND APPLICATIONS THEREFOR

(76) Inventors: George V. Eleftheriades, 59 Dorset Road, Scarborough, Ontario (CA), M1M 2S8; Keith G. Balmain, 44 Jackes Avenue, Apartment #1904, Toronto, Ontario (CA), M4T 1E5

( * ) Notice: Subject to any disclaimer, the term of this patent is extended or adjusted under 35 U.S.C. 154(b) by 4 days.

(21) Appl. No.: 10/453,907

(22) Filed: Jun. 2, 2003

(65) Prior Publication Data

US 2004/0066251 A1 Apr. 8, 2004

Related U.S. Application Data

(60) Provisional application No. 60/384,080, filed on May 31, 2002.

(51) Int. Cl.[7] .................................................. H01P 1/18
(52) U.S. Cl. ........................................ 333/156; 333/116
(58) Field of Search ................................. 333/156, 116, 333/204; 343/700

(56) References Cited

U.S. PATENT DOCUMENTS 6,731,244 B2 * 5/2004 Killen et al. ......... 343/700 MS

* cited by examiner

Primary Examiner—Brian Young
Assistant Examiner—Joseph Lauture
(74) Attorney, Agent, or Firm—Beyer Weaver & Thomas, LLP

(57) ABSTRACT

A linear metamaterial comprises a transmission line, having a linear dimension, and is loaded with capacitors, and shunted with an inductor such that for an electromagnetic wave, having a wavelength greater than the linear dimension and traveling along the axis of the transmission line, the effective permeability and permittivity of the metamaterial are simultaneously negative. Applications for the metamaterial are also disclosed.

18 Claims, 28 Drawing Sheets

Capacitance: 1 pF (at each end of each segment)
Inductance: 25.33 nH (at each end of each segment)
Load Resistances: 300 Ohms
Source Voltage: 1 V
Grid Spacing: 1 mm
Height above ground: 1 mm (a)  (b)

METAMATERIALS FOR CONTROLLING AND GUIDING ELECTROMAGNETIC RADIATION AND APPLICATIONS THEREFOR

CROSS-REFERENCE TO RELATED APPLICATIONS

The present application claims the benefit of U.S. Provisional Patent Application No. 60/384,080 filed on May 31, 2002, which is hereby incorporated by reference herein.

FIELD OF THE INVENTION

The present invention relates generally to the control and guidance of electromagnetic radiation and in particular to a left-handed metamaterial for controlling and guiding electromagnetic radiation and to applications therefor.

BACKGROUND OF THE INVENTION

The concept of a negative index of refraction, originally proposed by Veselago in the 1960s, suggested the possibility of materials in which the permittivity and permeability could be made simultaneously negative. Veselago termed these left-handed media (LHM), because the vectors E, H, and k would form a left-handed triplet instead of a right-handed triplet, as is the case in conventional, right-handed media (RHM). In such a material the phase velocity and Poynting vector are antiparallel. Recently, novel 3-dimensional (3-D) electromagnetic materials have successfully demonstrated negative refraction by synthesizing a negative refractive index. These artificial dielectrics (metamaterials) consist of loosely coupled unit cells composed of thin wire strips and split-ring resonators to synthesize negative permittivity and permeability, respectively. In these metamaterials, the choice of operating frequency is restricted to the region of the resonance, which results in a highly dispersive, narrow and behaviour with strong associated absorption losses.

Other structures with magnetic properties to refract electromagnetic radiation at negative angles have also been considered. For example, International PCT Application No. WO 00/41270 discloses a structure that exhibits magnetic properties when it receives incident electromagnetic radiation. The structure is formed from an array of capacitive elements, each of which is smaller, and preferably much smaller, than the wavelength of the incident electromagnetic radiation. Each capacitive element has a low-resistance conducting path associated with it and is such that a magnetic component of the incident electromagnetic radiation induces an electrical current to flow around a path and through the associated capacitive element. The creation of the internal magnetic fields generated by the flow of the induced electrical current gives rise to the structure's magnetic properties.

International PCT Application No. WO 02/03500 discloses a microstructured magnetic material having a magnetic permeability of negative value but unity magnitude over a particular radio frequency range.

Although the above references disclose structures with magnetic properties to refract electromagnetic radiation at negative angles, improved materials exhibiting negative refractive indices are desired.

It is therefore an object of the present invention to provide a novel left-handed metamaterial for controlling and guiding electromagnetic radiation and novel applications therefor.

SUMMARY OF THE INVENTION

According to one aspect of the present invention there is provided a planar metamaterial comprising:

two substantially orthogonal, coplanar sets of transmission lines, said transmission lines being spaced with a periodicity, loaded with capacitors with said periodicity, and shunted with inductors with said periodicity such that for an electromagnetic wave, having a wavelength greater than said periodicity and traveling along the plane of said transmission lines, the effective permeability and permittivity of said metamaterial are simultaneously negative.

According to another aspect of the present invention there is provided a linear metamaterial comprising:

a transmission line, having a linear dimension, and being loaded with capacitors, and shunted with an inductor such that for an electromagnetic wave, having a wavelength greater than said linear dimension and traveling along the axis of said transmission line, the effective permeability and permittivity of said metamaterial are simultaneously negative.

According to yet another aspect of the present invention there is provided a planar resonance cone metamaterial comprising:

a first set of transmission lines, spaced with a periodicity, and loaded with capacitors with said periodicity;

a second set of transmission lines, substantially orthogonal and coplanar with said first set of transmission lines, said second set of transmission lines being spaced with said periodicity, and loaded with inductors with said periodicity, said first and second sets of transmission lines exhibiting characteristics such that for an electromagnetic wave, having a wavelength greater than said periodicity by an order of magnitude, and traveling along the linear axis of said first set of transmission lines, the effective permittivity of said metamaterial is positive such that for an electromagnetic wave, having a wavelength greater than said periodicity by an order of magnitude and traveling along the linear axis of said second set of transmission lines, the effective permittivity of said metamaterial is negative.

According to yet another aspect of the present invention there is provided a planar resonance cone metamaterial comprising:

a first set of transmission lines, spaced with a first periodicity, and loaded with capacitors with a second periodicity;

a second set of transmission lines, substantially orthogonal and coplanar with said first set of transmission lines, said second set of transmission lines being spaced with said second periodicity, and being loaded with inductors with said first periodicity whereby for an electromagnetic wave, having a wavelength greater than said first and second periodicities by an order of magnitude and traveling along the longitudinal axis of said first set of transmission lines, the effective permittivity of said metamaterial is positive and for an electromagnetic wave having a wavelength greater than said first and second priodocities and traveling along the longitudinal axis of said second set of transmission lines, the effective permittivity of said metamaterial is negative.

According to yet another aspect of the present invention there is provided a near field focusing device comprising:

a first set of transmission lines, said first set of transmission lines being spaced with a first periodicity and loaded with capacitors with a second periodicity;

a second set of transmission lines, substantially orthogonal to, and coplanar with said first set of transmission lines, said second set of transmission lines being spaced with said second periodicity, loaded with capacitors with said first periodicity, and shunted with inductors, said first set of transmission lines intersecting said second set of transmission lines such that for an electromagnetic wave, having a wavelength greater than said first or second periodicity by an order of magnitude, and traveling along the plane of said transmission lines, the effective permeability and permittivity of said metamaterial are simultaneously negative; and a planar waveguide, having a flat extent, coupled to said transmission lines, such that said flat extent is parallel to one set of transmission lines.

According to yet another aspect of the present invention there is provided a phase-shifting device comprising:

a transmission line, having a linear dimension and characteristic impedance;

capacitors loaded on said transmission line; and an inductor shunting said transmission line, said transmission line exhibiting characteristics such that for an electromagnetic wave, having a wavelength greater than said linear dimension by an order of magnitude and traveling along the axis of said transmission line, the effective permeability and permittivity of transmission are simultaneously negative and such that said transmission line provides a continuous passband for said electromagnetic wave along said transmission line.

According to yet another aspect of the present invention there is provided a near field focussing device comprising:

a parallel-plate waveguide; and a negative refractive index metamaterial in line with said waveguide and forming an interface therewith.

According to yet another aspect of the present invention there is provided a coupled-line coupler comprising:

a microstrip line; and a left-handed material coupled to an edge of said microstrip line.

The present invention provides advantages in that the metamaterial is capable of internal positive and negative wave refraction, and guided wave beam formation, steering, and focusing over regions that are smaller than the wavelength of incident electromagnetic radiation. Moreover, the beam steering capability can be extended beyond the physical boundaries of the metamaterial into the surrounding space to produce a controllable radiation pattern.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENT

The present invention relates generally to a metamaterial that supports propagating backward waves and thus exhibits left-handedness. Such metamaterials inherently support 2-D wave propagation, which is desirable for antennas, antenna beam formers, planar spectrum analyzers, compact RF/microwave lenses and antennas, phase compensators, antenna-integrated multiplexers and other microwave circuit applications.

Figure 1:
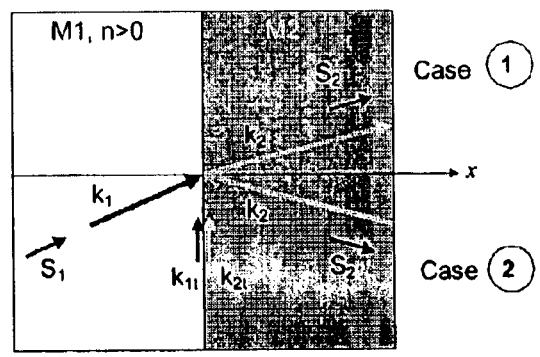
FIG. 1 shows phase matching at an interface between a right-handed material (RHM) and a generic material i.e. a right-handed material or a left-handed material.

To illustrate the concept of negative refraction, consider a phase-matching argument at the interface between a right-handed medium M1 and another generic medium M2, as shown in FIG. 1. The sign of the index of refraction of medium M2 is not a concern. Consider an incident plane wave in medium M1 with a wave vector $k_1$ (i.e. such that the x-component of $k_1$ is positive). A refracted wave with a wave vector $k_2$ is then established in medium M2 such that the tangential wave vector components $k_{1t}$ and $k_{2t}$ are equal across the interface. This is the basis for Snell's Law, and it permits two scenarios for the orientation of $k_2$, represented as Case 1 and Case 2 in FIG. 1. The conservation of energy also insists that the normal components of the Poynting vectors $S_1$ and $S_2$ remain in the positive-x direction through both media. If the medium M2 is a conventional RHM, then refraction occurs as illustrated by Case 1. However, if medium M2 is a medium supporting propagating backward waves (i.e. a LHM), it is implied that power is propagated along the direction of phase advance, which requires in FIG. 1 that $k_2$ and $S_2$ be antiparallel. Consequently, the direction of $k_2$ is specified uniquely for backward-wave structures as illustrated by Case 2. Under such conditions, power is refracted through an effectively negative angle, which implies a negative index of refraction.

Metamaterials exhibiting negative indices of refractions and applications therefor that enable electromagnetic radiation to be controlled and guided will now be described.

Planar Metamaterials

Figure 2:
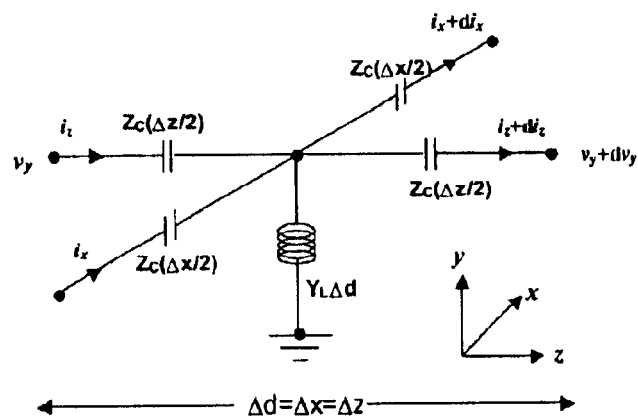
FIG. 2 is a two-dimensional (2-D) loaded left-handed transmission line unit cell.

Turning now to FIG. 2, a shunt-centered unit cell for a metamaterial or left-handed medium (LHM) that synthezises a negative refractive index is shown. In this particular example, the metamaterial is in the form of a two-dimensional (2-D), L-C loaded substantially orthogonal, coplanar transmission line network. In the unit cell, $Z_C = (j\omega C)^{-1}$ and $Y_L = (j\omega L)^{-1}$ represent the per-unit-length capacitor impedance and inductor admittance, respectively.

The unit cell dimensionality represented by $\Delta d$ is provided by the host transmission line medium. At the continuous medium limit, $\Delta d \ll \lambda$, the 2-D telegrapher's equations representing the structure of the unit cell can be expressed as:

$$\frac{\partial v_y}{\partial z} = -i_z\left(\frac{1}{j\omega C \Delta d}\right), \frac{\partial v_y}{\partial x} = -i_x\left(\frac{1}{j\omega C \Delta d}\right) \quad (1)$$

and $$\frac{\partial i_z}{\partial z} + \frac{\partial i_x}{\partial z} = -v_y\left(\frac{1}{j\omega L \Delta d}\right). \quad (2)$$

Combining equations (1) and (2) yields:

$$\frac{\partial^2 v_y}{\partial x^2} + \frac{\partial^2 v_y}{\partial z^2} + \beta^2 v_y = 0, \quad \beta = -\frac{1}{\omega\sqrt{LC}\,\Delta d} \quad (3)$$

where $\beta$ is the propagation constant. The phase and group velocities are antiparallel and are given by:

$$v_\phi = \frac{\omega}{\beta} = -\omega^2\sqrt{LC}\,\Delta d,\ v_g = \left(\frac{\partial \beta}{\partial \omega}\right)^{-1} = +\omega^2\sqrt{LC}\,\Delta d. \quad (4)$$

Subsequently, a negative refractive index can be defined as:

$$n = \frac{c}{v_\phi} = -\frac{1}{\omega^2\sqrt{LC}\,\sqrt{\mu_0\varepsilon_0}\,\Delta d}. \quad (5)$$

It is interesting to note that it is possible to achieve the same result for the phase velocity and index of refraction if an equivalent negative permittivity and permeability are defined as:

$$\mu_{eq} = -\frac{1}{\omega^2 C \Delta d}, \varepsilon_{eq} = -\frac{1}{\omega^2 L \Delta d}, \quad (6)$$

so that the total stored time-averaged energy, expressed by:

$$W = \frac{\partial(\mu_{eq}\omega)}{\partial \omega}|E|^2 + \frac{\partial(\varepsilon_{eq}\omega)}{\partial \omega}|H|^2, \quad (7)$$

remains positive.

In order to model the 2-D wave equation represented by equation (3), metamaterial including an array of unit cells, each as depicted in FIG. 2, was implemented in a microwave-circuit simulator simulator. To simulate the incidence of waves on this LHM in a circuit environment, a right-handed medium (RHM) was also designed. The topology of the unit cells in the RHM were identical to those of FIG. 2, except that the roles of C and L were interchanged, giving rise to the well-known LC low-pass network representation of free-space propagation.

The specification of the unit cell parameters in both media provides information about the permissible operating frequencies, the relative refractive indices, and also the required inductance and capacitance values. In both media, the wave impedance is given by:

$$Z_M = \sqrt{\frac{L}{C}}. \quad (8)$$

It is therefore reasonable to begin with the simple constraint that the two media be matched, and moreover, matched to free space ($Z_M$=377Ω).

In the limit $\Delta d \ll \lambda$ in equation (5), it is not possible to specify directly indices of refraction in the individual media, but it is possible to specify a relative index of refraction through the ratio of their respective phase shifts per unit cell $\beta_{LHM}\Delta d/\beta_{RHM}\Delta d$. The LHM was designed to be denser than the RHM, arbitrarily by a factor of 2. Specifically, phase shifts per unit cell of $|\beta_{RHM}\Delta d|$=0.25 and $|\beta_{LHM}\Delta d|$=0.5 were chosen in the right-handed and left-handed media, respectively. Choosing an operating frequency of 2 GHz, the LHM and RHM unit cell capacitive and inductive elements were specified as ($C_{LHM}$=422.5 fF, $L_{LHM}$=60.0 nH) and ($C_{RHM}$=52.8 fF, $L_{RHM}$=7.5 nH), respectively. The corresponding cut-off frequencies are given by:

$$f_{c,LHM} = \frac{1}{4\pi\sqrt{L_{LHM}C_{LHM}}}, \quad f_{c,RHM} = \frac{1}{\pi\sqrt{L_{RHM}C_{RHM}}}, \quad (9)$$

which were found to be 500 MHz and 16 GHz, respectively. Finally, the designed LHM and RHM arrays were appropriately terminated with matching resistors on all edges and simulated with a microwave-circuit simulator.

Figure 3:
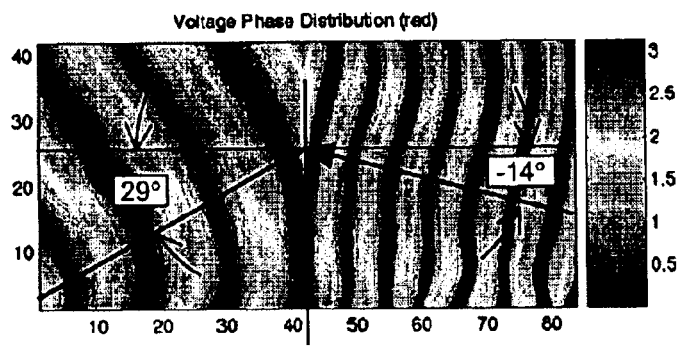
FIG. 3 shows a plane wave illuminating a RHM/LHM interface at 2 GHz.

To verify the ray picture presented in the phase-matching argument of FIG. 1, a RHM/LHM interface was constructed using 42×42 RHM and LHM unit cell arrays with $\beta_{RHM}\Delta d$=+0.25 and $\beta_{LHM}\Delta d$=−0.5, yielding a relative refractive index of −2. The RHM unit cell array was excited with a plane wave, which was simulated using sequentially phase-shifted voltage sources along the left boundary of the unit cell array. FIG. 3 illustrates the plane wave illuminating the RHM/LHM interface at 2 $GH_z$ for an incident angle of $\theta_{RHM}$=29° with the axes being labelled according to unit cell number and the right vertical scale designating radians. The steepest phase descent in the LHM is observed along the direction of propagation, which is $\theta_{LHM}$=−14° from the normal, in exact correspondence with Snell's Law for the given design parameters.

Figure 4:
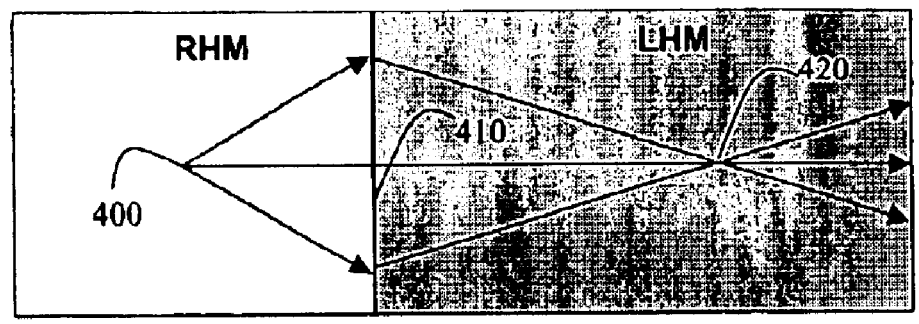
FIG. 4 illustrates the focusing effect at an interface between right-handed and left-handed media.

Turning now to FIG. 4, it can be seen that a RHM/LHM planar interface 410 can also be used to focus electromagnetic waves from a point source located inside the RHM, within the LHM. These conditions can be modelled by exciting a single node 400 inside the RHM and observing the magnitude and phase of the voltages to ground at all points in the LHM. The focusing effect manifests itself as a "spot" distribution of voltage 420 at a predictable location in the LHM.

An alternative embodiment of an RHM/LHM interface used to generate the results of FIG. 3 will now be examined. In this embodiment finite length transmission line sections (k, $Z_0$, finite $\Delta d$) are inserted in each LC unit cell. In order that the host transmission-line medium does not significantly alter the propagation constant predicted by equation (5), it is necessary to modify the loading elements $C_{LHM}$ and $L_{LHM}$ to compensate for the presence of the distributed transmission line parameters. In the final design, the lines in each unit cell are designed to be air-filled, with $\Delta d$=5 mm. From equation (5), and using the appropriately compensated loading element values, the corresponding equivalent, absolute index of refraction of the LHM is approximately equal to −2.4. To maintain the relative refractive index of −2, the absolute index of refraction of the RHM is made to be +1.2.

Figure 5:
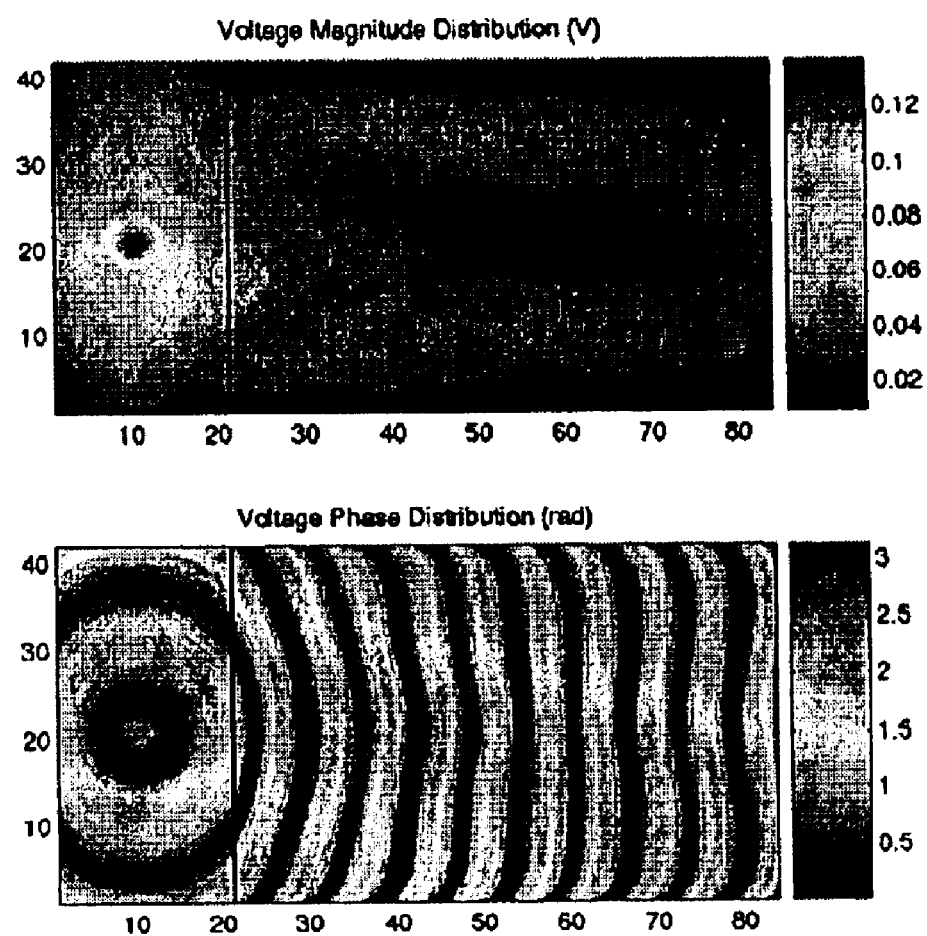
FIG. 5 shows a point source illuminating a RHM/RHM interface at 2 GHz.

In the interest of completeness, cases of both positive and negative refraction are examined, with the host transmission line medium in place. In the first case, a 42×21 RHM unit cell array is interfaced with another 42×63 RHM unit cell array with a relative refractive index of +2. The plane wave source is placed 11 unit cells into the first RHM. Here, focusing is not expected since Snell's Law for positive-index media predicts a continued divergence into the second RHM. FIG. 5 shows a point source illuminating the RHM/LHM interface at 2 $GH_Z$ as well as the corresponding magnitude and phase plots of these results with the axes labelled according to cell number. As can be seen, the results confirm that the cylindrical wave excitation diverges into the second medium.

Figure 6:
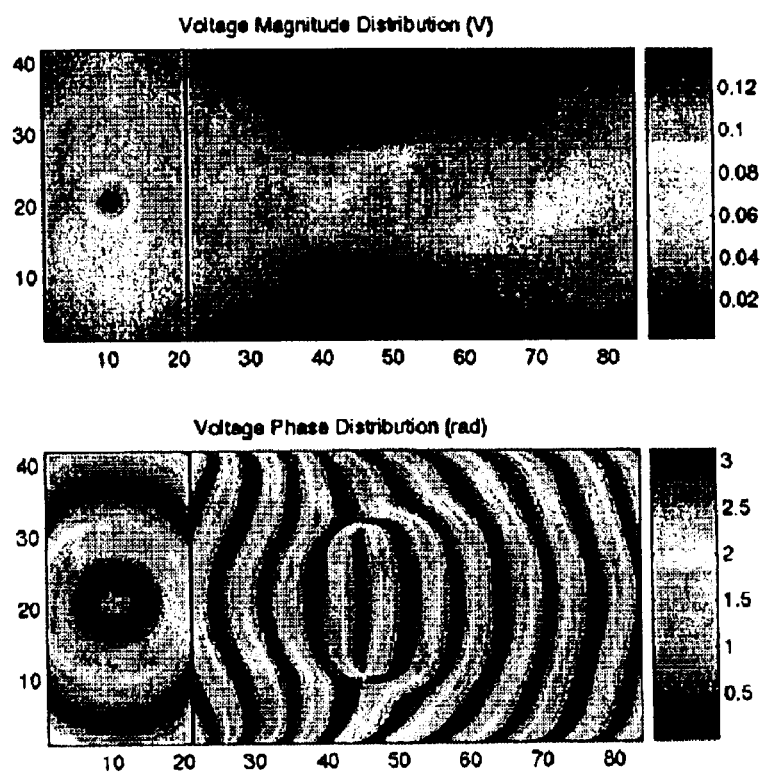
FIG. 6 shows a point source illuminating a RHM/LHM interface at 2 GHz.

In the second case, a RHM unit cell array is interfaced with a LHM unit cell array with a relative refractive index of −2. The unit cell array dimensions and source location are as specified above. This arrangement is expected to show focusing inside the LHM, in accordance with FIG. 4. The paraxial limit dictates a focus in the LHM at twice the distance of the source from the interface, or near unit cell 44 of the array. FIG. 6 shows the point source illuminating the RHM/LHM interface at 2 $GH_Z$, as well as the corresponding magnitude and phase results with the axes labelled according to cell number. As can be seen, the results show focusing in the LHM, manifested in increased voltage amplitudes (nearly 65% of the source amplitude), and also in the reversal of the concavity of the wavefronts at both the RHM/LHM boundary and the expected focal point.

For applications in which waves are propagated only in a single dimension e.g. phase-shifting lines as will be described, the metamaterial above may be simplified to a 1-D array using a single transmission line i.e. a linear LHM metamaterial is a simplified case of the planar metamaterial.

Since the metamaterial exhibits left-handedness and allows electromagnetic radiation to be guided and controlled, the metamaterial is useful in a number of applications. Examples of applications for the present metamaterial will now be described.

Near-Field Focusing Device

Figure 7:
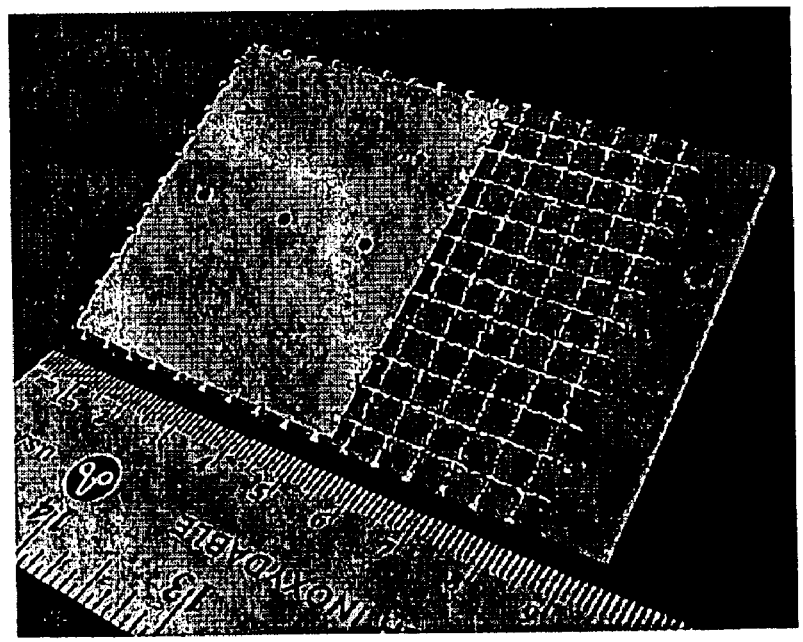
FIG. 7 shows a focusing device including a negative refractive index metamaterial interfaced with a parallel-plate waveguide at 1.5 GHz.

Turning now to FIG. 7, a focusing device is shown that includes a 55 mm×50 mm parallel-plate waveguide serving as a RHM interfaced with a negative refractive index metamaterial including an 11×6 unit cell array around 1.5 GHz. Each unit cell has a dimension of 5 mm. The fabricated 11×6 unit cell areas includes 400 $\mu$m wide microstrip lines on a 60 mil Rexolite® dielectric ($\in_r$=2.53) substrate. Shunt chip inductors are embedded into 1 mm holes drilled into the substrate at the appropriate unit cell sites. Chip capacitors are surface-mounted between gaps etched into the grid lines, and additional capacitors are placed at the array edges to maintain unit cell uniformity throughout. The two media meet along a flat border, defining their respective extents. The LHM extent is parallel to and displaced from the nearest microstrip line. The parallel-plate waveguide is excited with a shorted vertical probe connected to a SMA connector. Matching chip resistors of 100Ω are used to terminate the unit cells at the LHM and parallel-plate waveguide boundaries. The focusing device as shown measures approximately 60 mm×95 mm×1.5 mm.

Figure 8:
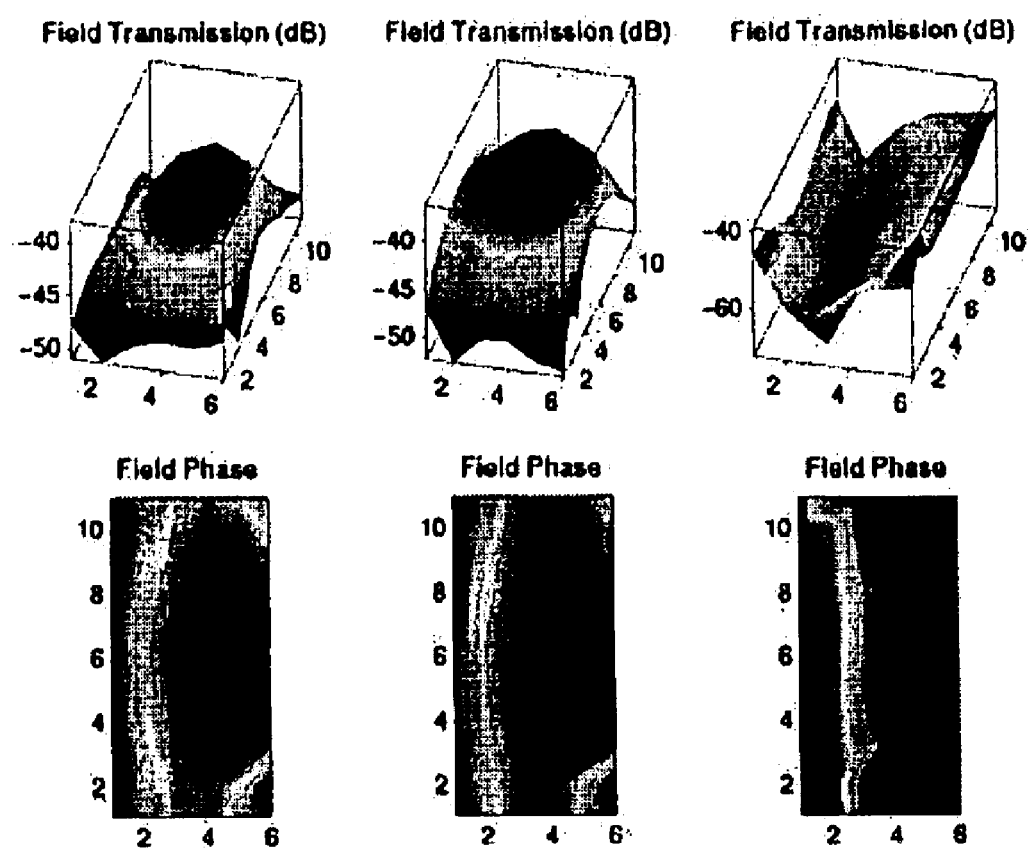
FIG. 8 shows experimental data demonstrating focal regions observed in the focusing device of FIG. 7 at 1.55 GHz and 1.65 GHz and the lack thereof at 2.55 GHz when operating beyond the left-handed frequency band.

FIG. 8 shows a sample of measured vertical E-field distributions over the 11×6 LHM unit cell array at 1.55 GHz, 1.65 GHz, and 2.55 GHz. The first two frequencies lie in the LH passband, whereas the last frequency occurs in a second (RH) passband. In accordance with theory, the field distributions at 1.55 GHz and 1.65 GHz exhibit focusing, manifested by a localized region of increased transmission through the focusing device. The maximum focal amplitude obtained was observed at a frequency of 1.65 GHz (the central plot of FIG. 8), where the distinction between the peak and the two edges of the spot was noted to be approximately 15 dB. Furthermore, the concavities of the wavefronts of FIG. 8 also indicate the convergent progression of phase associated with focusing. As expected, neither phenomenon is evident at 2.55 GHz, since the second passband does not possess left-handed properties. As will be appreciated, the results demonstrate focusing of an incident cylindrical wave over an electrically short area, i.e. near-field focusing.

Planar Resonance Cone Metamaterial

Figure 9:
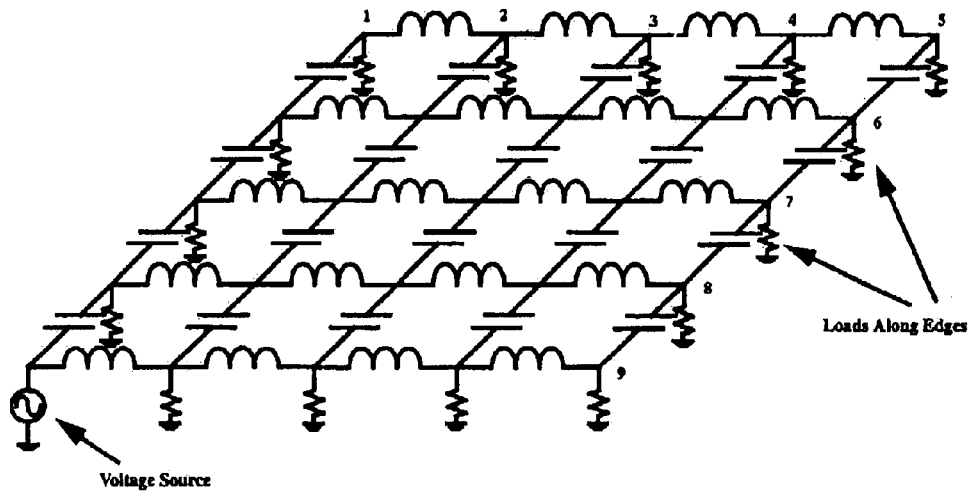
FIG. 9 shows a planar resonance cone metamaterial including a square-celled transmission-line network containing inductors and capacitors oriented orthogonally and positioned over a ground plane.
Figure 10:
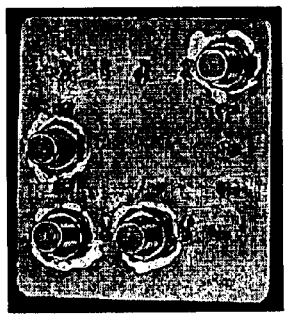
FIG. 10 shows one side of the square-celled transmission-line network of FIG. 9 illustrating attached coaxial connectors.
Figure 11:
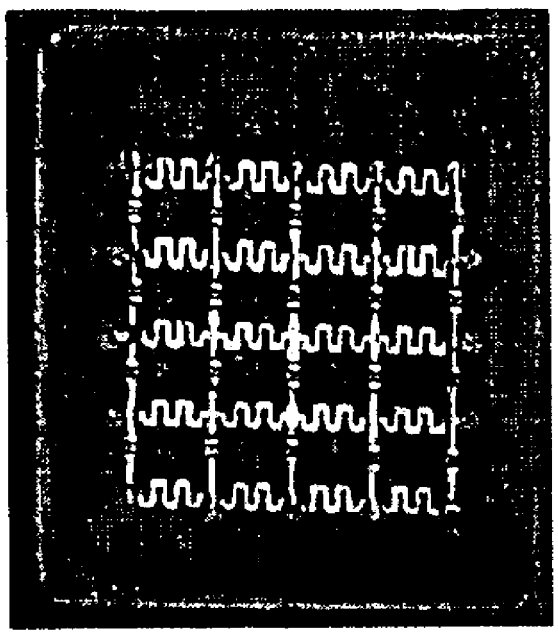
FIG. 11 shows an opposite side of the square-celled transmission-line network of FIG. 9, with chip capacitors and meander-line inductors in place.

Turning now to FIGS. 9 to 11, a planar resonance cone metamaterial is illustrated. In this embodiment, the metamaterial includes a substantially orthogonal, coplanar, periodic square-celled transmission line network that is analogous to a sheet of uniaxial plasma with permittivities of opposite signs in two orthogonal, in-plane directions. As can be seen, the transmission line network is disposed over a ground plate and parallel to it. Electromagnetic radiation is fed to the transmission line network at one corner with respect to the ground plate. The transmission line network is connected to instruments through coaxial connectors as shown in FIG. 10 and includes chip capacitors and meander-line inductors as shown in FIG. 11. Resonance cone angle scans with frequency and with peak frequencies detected at the midpoints of the transmission line network sides, yielded an end-to-end frequency ratio of 2:1 with a transmission line network of only 4 cells by 4 cells. A center frequency of 1.4 GHz was used. The commercial chip capacitive and inductive elements used to construct the transmission line network yielded a compact array. A larger transmission line network having 24 cells by 24 cells was also modelled computationally. This transmission line network displayed resonance cones that showed little or no near-field beam spreading with increasing distance from the source. When a cone beam encountered an edge of the transmission line network with insufficient resistive absorption, specular reflection of the cone beam was observed.

Changing the reactive loads creates a different transmission line network. For example, a "transpose" transmission line network can be created by interchanging the inductive and capacitive elements.

Phase-Shifting Line Using a Linear Metamaterial

Figure 12:
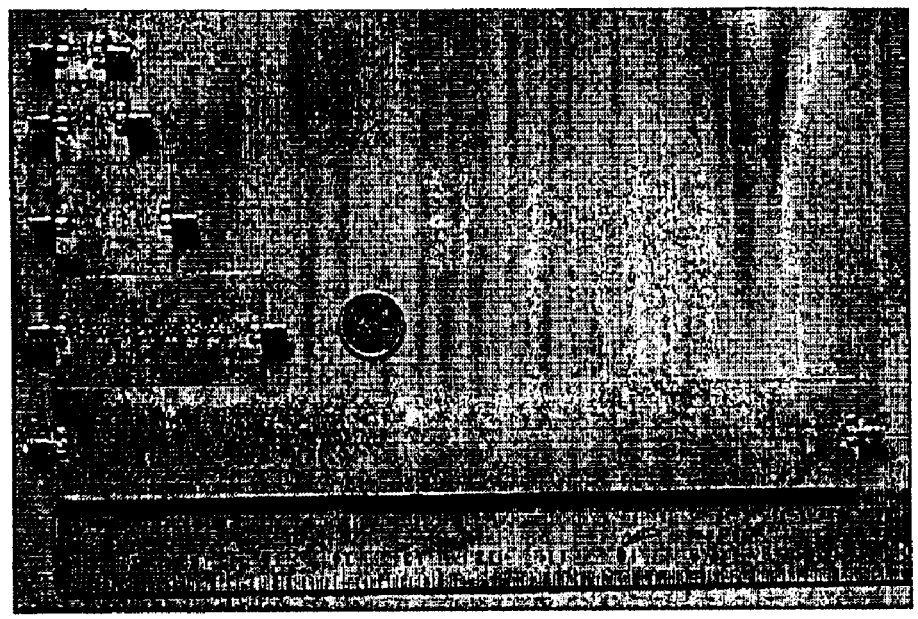
FIG. 12 shows single-stage, 2-stage, 4-stage and 8-stage 0° phase-shifting circuits.

The metamaterial in accordance with the present invention is also suitable for use in a compact 1-D phase-shifting device that can be used to synthesize arbitrary transmission phases. Such as shifting device includes sections of LHM metamaterial lines cascaded with sections of conventional RHM transmission lines. Several embodiments of such a phase-shifting device, having a 1, 2, 4, and 8 stages can be seen in FIG. 12. The phase-shifting device offers significant advantages when compared to standard delay transmission lines. The phase-shifting device is more compact in size and can achieve a positive, a zero, or a negative phase shift while occupying the same or shorter physical length. The phase-shifting device also exhibits a linear, flatter phase response with frequency, leading to shorter group delays.

In a LHM, the phase leads in the direction of group velocity, therefore incurring a positive phase shift with propagation away from the source. In addition, it is well known that in conventional RHM transmission lines, the phase lags in the direction of positive group velocity, thus incurring a negative phase shift with propagation away from the source. It therefore follows that phase compensation can be achieved at a given frequency by cascading a section of a LHM with a section of a RHM to form a unit cell with a given phase shift.

Figure 13:
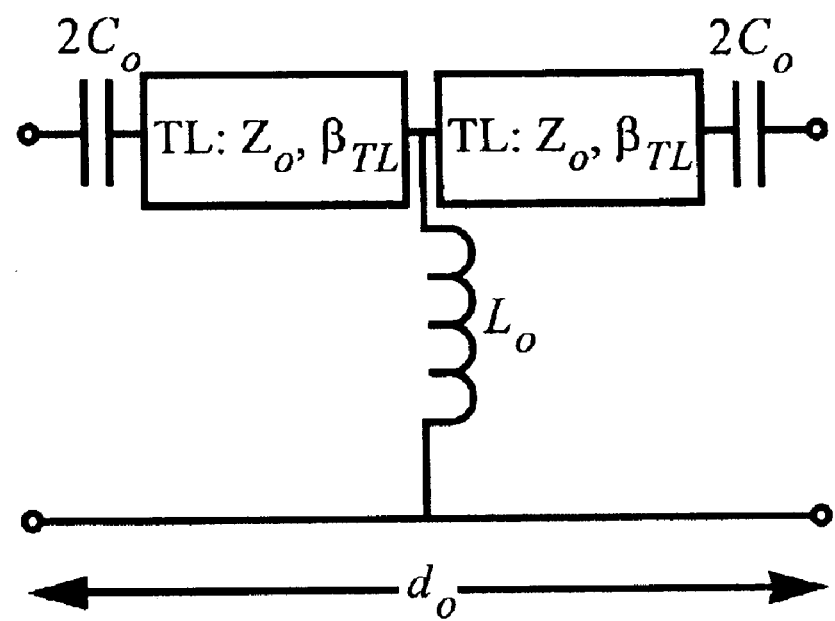
FIG. 13 is a schematic diagram of a 1-D phase-shifting unit cell.

The unit cell of the phase-shifting device is shown in FIG. 13 and has total dimension $d_o$. The unit cell includes a host transmission line medium TL periodically loaded with discrete lumped element components, $L_o$ and $C_o$.

The dispersion characteristics of the unit cell can be determined by the following equations:

$$\cos(\beta_{Bloch}d) = \cos(\beta_{TL}d)\left(1 - \frac{1}{4\omega^2 L_o C_o}\right) + \sin(\beta_{TL}d)\left(\frac{1}{\omega C_o Z_o} + \frac{Z_o}{\omega L_o}\right) - \frac{1}{4\omega^2 L_o C_o} \quad (10)$$

where:

$\beta_{Bloch}$ is the Bloch propagation constant; and $\beta_{TL} = \omega\sqrt{LC}$ is the propagation constant of the host transmission line.

In order to consider a series of cascaded unit cells as an effective periodic medium, the physical length of the unit cell must be much smaller than a wavelength, therefore restricting the phase shift per unit cell and the length of the transmission lines to small values ($\beta_{Bloch}d \ll 1$ and $\beta_{TL}d \ll 1$). Thus, an effective propagation constant, $\beta$eff, can be defined for the medium by the following equation:

$$\beta_{eff} = \pm\sqrt{\left(L - \frac{1}{\omega^2 C_o d}\right)\left(C - \frac{1}{\omega^2 L_o d}\right)} \quad (11)$$

Figure 14:
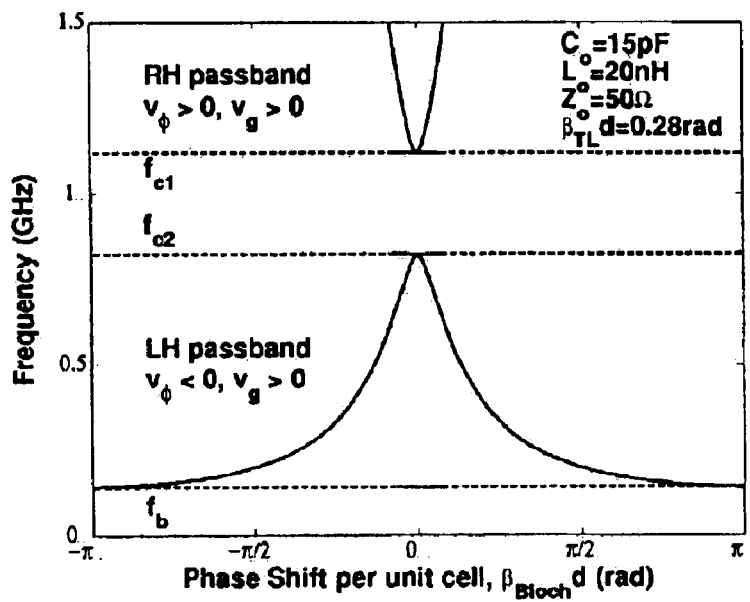
FIG. 14 shows an unmatched dispersion relation for the phase-shifting unit cell of FIG. 13.

FIG. 14 shows the dispersion relation for a unit cell with typical parameters $C_o$=15 pF, $L_o$=20 nH, $Z_o$=50Ω and $\beta_{TL}d$=0.28 rad. It can be observed that the corresponding dispersion diagram exhibits a band structure with two distinct passbands and stopbands. Expressions for the pertinent cut-off frequencies as indicated in FIG. 14 are as follows:

$$f_b = \frac{1}{4\pi\sqrt{L_o C_o}}, \quad f_{c1} = \frac{1}{2\pi\sqrt{LC_o}}, \quad f_{c2} = \frac{1}{2\pi\sqrt{L_o C}} \quad (12)$$

Equating $f_{c1}$ and $f_{c2}$ causes the stopband between these two cut-off frequencies to close and the band becomes continuous. This corresponds to the following matching condition for the LHM and RHM sections:

$$Z_o = \sqrt{L_o/C_o} = \sqrt{L/C} \quad (13)$$

Under this condition, it can be shown that the effective propagation constant of equation (11) simplifies to the expression:

$$\beta_{eff} \approx \omega\sqrt{LC} + \frac{-1}{\omega\sqrt{L_o C_o}} \quad (14)$$

Expression (14) can be interpreted as the sum of the propagation constants of the host transmission line and a uniform LHM line. For a transmission line medium with periodicity d and phase shift $\phi_{TL} = \beta_{TL}d$, the total phase shift per unit cell, $|\phi_o|$, given that the matching condition of equation (13) is satisfied, can be written as:

$$|\phi_o| = \beta_{\mathit{eff}} d = \phi_{TL} + \frac{-1}{\omega\sqrt{L_o C_o}} \quad (15)$$

Thus equations (13) and (15) can be used to determine unique values for $L_o$ and $C_o$ for any phase shift, $\phi_o$, given a transmission line section with intrinsic phase shift $\beta_{TL}$ and characteristic impedance $Z_o$.

Figure 15:
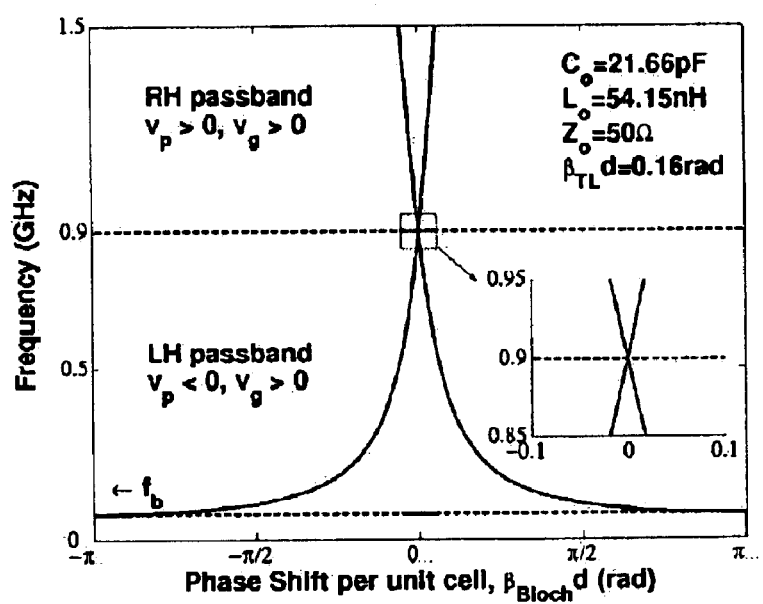
FIG. 15 shows a matched dispersion relation for the phase-shifting unit cell of FIG. 13.

The unit cell of FIG. 13 was implemented in coplanar-waveguide (CPW) technology at a design frequency of $f_o$=0.9 GHz using microwave-circuit simulator. The lumped element components and the transmission lines were assumed to be ideal. The transmission lines were designed with $Z_o$=50Ω, $\in_r$=2.2, dielectric height, h=20 mils and length d=7.4 mm. The dispersion relation for the unit cell with $\phi_o$=0° is shown in FIG. 15. The impedance matching condition of equation (13) has been satisfied and therefore, the stopband has been closed. It can also be observed that at $f_o$=0.9 GHz, the phase shift is 0°.

Figure 16:
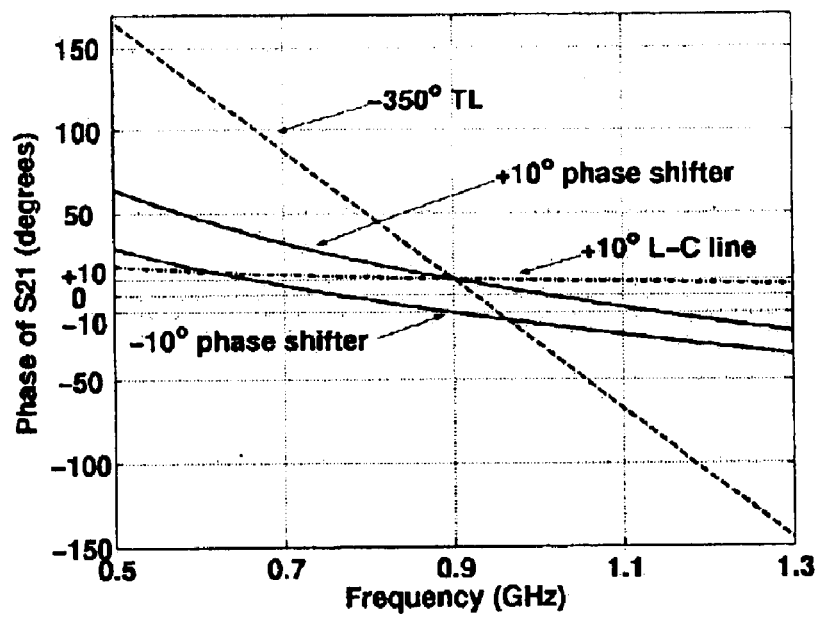
FIG. 16 shows phase responses of a +10° phase-shifting device, a −350° transmission line, a −10° phase-shifting device and +10° L-C line.

Based on the above parameters a +10-degree phase-shifting device was designed including 4 unit cells of total physical length 0.11λCPW=32 mm, with loading element values of $C_o$=21.66 pF and $L_o$=54.15 nH. The resulting phase characteristic of the phase-shifting device is shown in FIG. 16. It can be observed that the phase shift is +10 degrees at fo=0.9 GHz with a phase slope of −95.7-degrees/GHz. In addition, the phase response around fo is linear with respect to frequency, implying a constant group delay for the phase-shifting device. Also shown in FIG. 16 is the phase characteristic of a conventional 50Ω transmission line of length 35/36 λCPW=275.7 mm for comparison. The transmission line exhibits as expected a −350-degree phase shift at fo, which is equivalent to +10 degrees, with a phase slope of −389-degrees/GHz. In addition, its physical length is approximately 9 times longer than the 4 unit cell phase-shifting line.

Referring back to FIG. 12, an impression of the relative sizes of the two structures can be obtained. The proposed +10-degree phase-shifting device offers two main advantages over its equivalent transmission line implementation, namely a +10-degree phase shift while occupying significantly less physical space than a conventional transmission line, and a shorter group delay which is desirable for applications that require broadband operation.

Also shown in FIG. 16 is the phase characteristic of a 4-stage −10° phase-shifting device with loading element values of $C_o$=29.46 pF and $L_o$=73.65 nH. It can be observed that the −10° phase characteristic is similar to the +10° phase characteristic, with a phase slope of −72.9°/GHz. The −10° phase-shifting device occupies the same physical length as the +10° phase-shifting device and has loading element values that are at a ratio of approximately 1.4:1 compared to the ones used for the +10° phase shifting device. This implies that a reasonable variation of the loading element values using tuneable components can produce either a positive or a negative phase shift.

FIG. 16 also shows the phase characteristic of a 4-stage +10° uniform backward wave L-C line with loading element values of $C_o$=81.06 pF and $L_o$=202.64 nH. This corresponds to the unit cell of FIG. 13 with the transmission line sections removed. Setting therefore φTL to zero in equation (15), implies that $\phi_o$ will always remain negative, corresponding to a phase advance for a positively traveling plane wave of the form exp(−jβeffd). The absence of transmission lines implies that any combination of $C_o$ and $L_o$ values will produce a phase shift that will always be greater than 0 degrees for the unit cell. This is verified by the phase characteristic of the L-C line in FIG. 16 that stays well above 0 degrees at all times. Therefore, although the backward wave L-C line and the proposed unit cell of FIG. 13 can both provide positive phase shifts, the latter has the additional advantage of being able to provide a negative phase shift by simply varying the loading element values. More importantly, short, broadband 0-degree phase shift lines can be realized which can be used in numerous applications.

The 1-D phase-shifting structures were constructed using CPW technology on a Rogers™ RT5880 substrate with ∈r=2.2, and a dielectric height, h=20 mils. Standard size 0402 Panasonic ECJ-0EC capacitors were used for $C_o$ with dimensions L=1 mm, W=0.5 mm, and H=0.5 mm, and standard size 0603 Panasonic ELJ-RE/FJ inductors were used for $L_o$ with dimensions L=1.6 mm, W=0.8 mm, and H=0.8 mm. The 50Ω transmission lines were designed to have a length of d=7.4 mm, and a gap of s=0.6 mm was created to accommodate the series capacitors, resulting in a unit cell of total length $d_o$=8 mm. At 0.9 GHz the transmission lines were designed with a center conductor width of w=4 mm and a gap between the center conductor and the ground plane of g=0.106 mm. In addition, two 5 mm transmission lines were added to each end of the phase-shifting devices in order to accommodate SMA connectors. A Thru-Reflect-Line (TRL) calibration was carried out in order to remove the effects of the connectors and establish the reference planes at the input and output ports of the phase-shifting devices. All measurements were carried out on a HP8753C series vector network analyzer. The simulated results were obtained by replacing the ideal models for the capacitors and inductors with their corresponding S-parameter files provided by the vendors. Since the S-parameter files were extracted directly from device measurements, they therefore contain all the parasitic values associated with each component.

Figure 17:
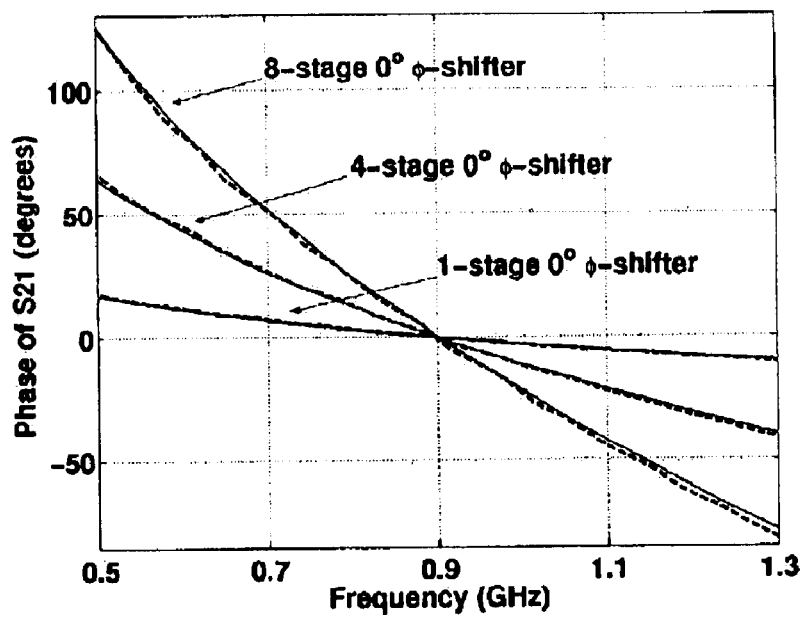
FIG. 17 shows phase responses of one-stage, 4-stage and 8-stage 0° phase-shifting devices.

FIG. 17 shows the simulated ( - - - ) and measured (-) phase responses of 1-stage, 4-stage and 8-stage 0° phase-shifting devices with loading element values of $C_o$=12 pF and $L_o$=100 nH. It can be observed that the experimental results match very closely the simulated results, with phase slopes of −30.2°/GHz, −122.1°/GHz and −237.5°/GHz for the phase-shifting devices respectively. The measured insertion losses are 0.1 dB, 0.7 dB and 1.6 dB respectively at $f_o$=0.9 GHz. It is therefore evident that any number of stages can be used in order to produce the desired phase shift, however as the number of stages increases, so does the slope of the phase characteristic. For broadband applications therefore, it is desirable to keep the number of stages to a minimum.

Figure 18:
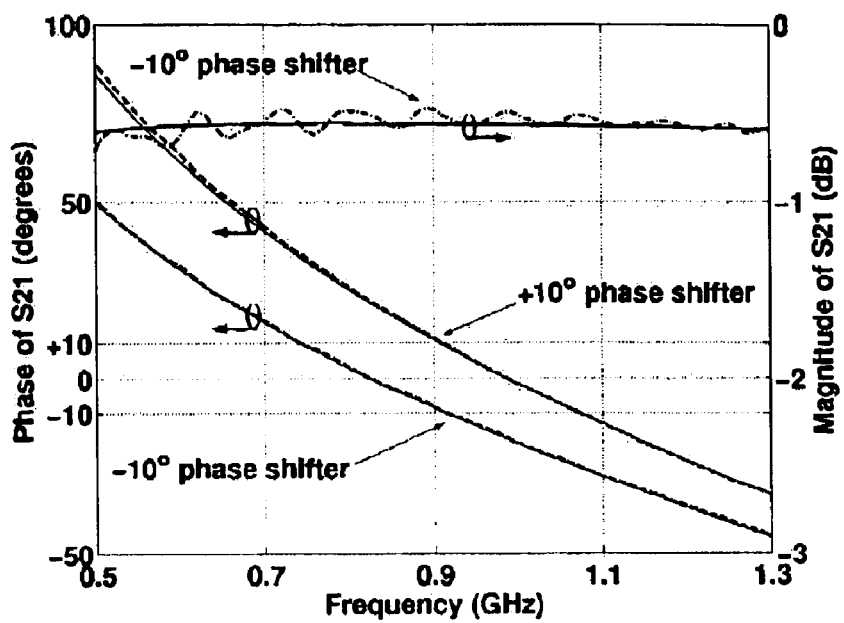
FIG. 18 shows phase and magnitude responses of +10° and −10° 4-stage phase-shifting devices.
Figure 19:
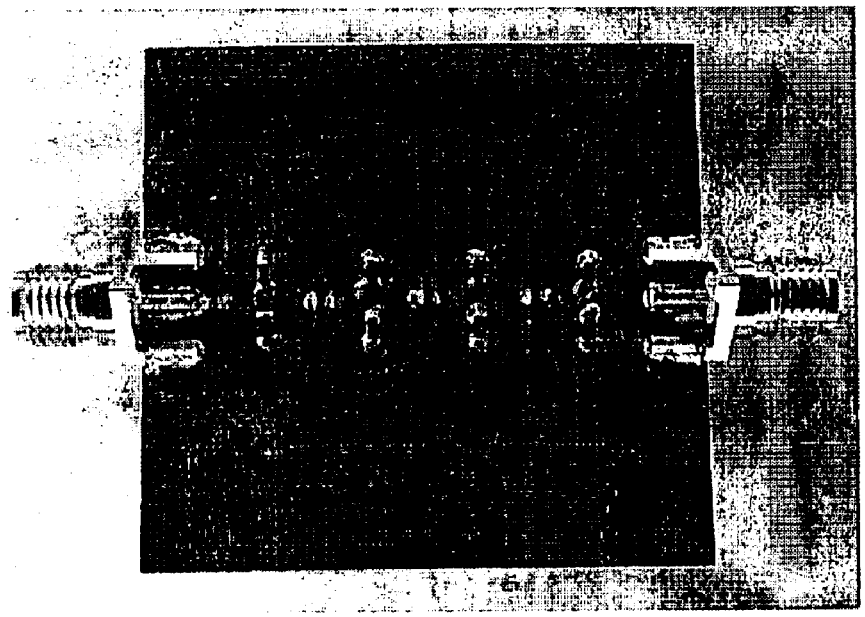
FIG. 19 shows a 4-stage +10° phase-shifting device.

FIG. 18 shows the simulated ( - - - ) and measured (-) phase responses of a 4-stage +10° phase-shifting device with loading element values of $C_o$=12 pF and $L_o$=68 nH and a 4-stage −10° phase-shifting device with loading element values of $C_o$=15 pF and $L_o$=120 nH. It can be observed that the experimental results correspond very closely to the simulated results with phase slopes of −136.6°/GHz and −108.4°/GHz for the +10° and −10° phase-shifting devices respectively. Also shown in FIG. 18 is the magnitude response of the −10° 4-stage phase-shifting device. The simulated ( - - - ) and measured (-) results correspond closely, however as the number of stages is increased the phase-shifting device begins to radiate, and resembles a leaky-wave structure. Therefore the phase-shifting devices should be kept short in length to avoid unnecessary energy leakage. The measured insertion losses at $f_o$=0.9 GHz are 0.4 dB and 0.5 dB respectively for the +10° and −10° phase-shifting devices.

The phase-shifting devices described above use cascaded sections of LHM lines and conventional transmission lines and offer significant advantages over conventional delay lines and uniform backward-wave L-C lines. The phase-shifting devices are compact in size, can be easily fabricated using standard etching techniques and exhibit a linear phase response around the design frequency. The phase-shifting devices can incur a negative or a positive phase, as well as a 0° phase depending on the values of the loading elements, while maintaining a short physical length. In addition, the phase incurred is independent of the length of the phase-shifting devices. Due to the compact, planar design, the phase-shifting devices are easily integrated with other microwave components and devices making them ideal for broadband applications requiring small, versatile, linear phase shifters.

Spectrum Analyser Using a Resonance Cone Metamaterial

Figure 21:
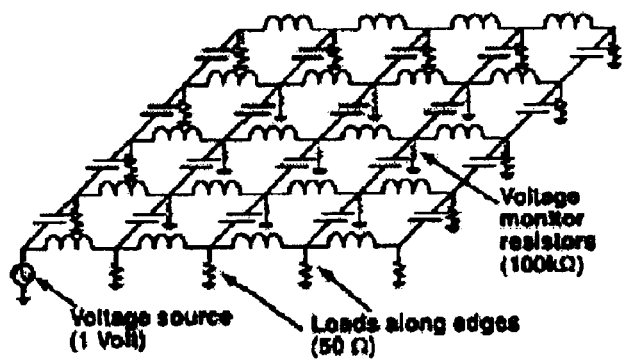
FIG. 21 is a schematic diagram of a focusing device in the form of a uniform anisotropic planar L-C grid over ground, with corner feed and resistive edge-loading.

The resonance cone metamaterial is useful in spectrum analysis. To illustrate this, a spectrum analyser incorporating resonance cone metamaterial was simulated. For the representation of metamaterial, analyser simulations employed a full-electromagnetic, thin-wire moment-method program, permitting the insertion of lumped circuit elements in finite-length wire segments. The basic network simulated is shown in FIG. 21, and includes a 12×12 unit cell array, each unit cell being a 2.5 mm square, yielding a total grid size of 30 mm×30 mm. The grid is disposed above the ground plane a distance of 2.5 mm. The capacitance was 2 pF per segment and the inductance was 5.6 nH per segment. The chosen capacitance and inductance values were selected for availability as well as to achieve the desired resonance cone effects using existing X-Y scanning and network analysis equipment. The inductors used in the experiment had a manufacturer nominal quality factor Q of around 27. This was achieved in the simulation by adding a 1.6Ω resistor in series with each inductor. A resistor of the same value was added in series with each capacitor as well. Also shown in FIG. 21 is a 100 kΩ resistor from each grid intersection to ground to enable deduction of the grid-to-ground voltage from the computed resistor current. Along the edges, 50Ω resistors were connected to ground in place of the 100 kΩ resistors. For this value of edge resistance, resonance cone specular reflection from the edges is not significant.

Figure 22:
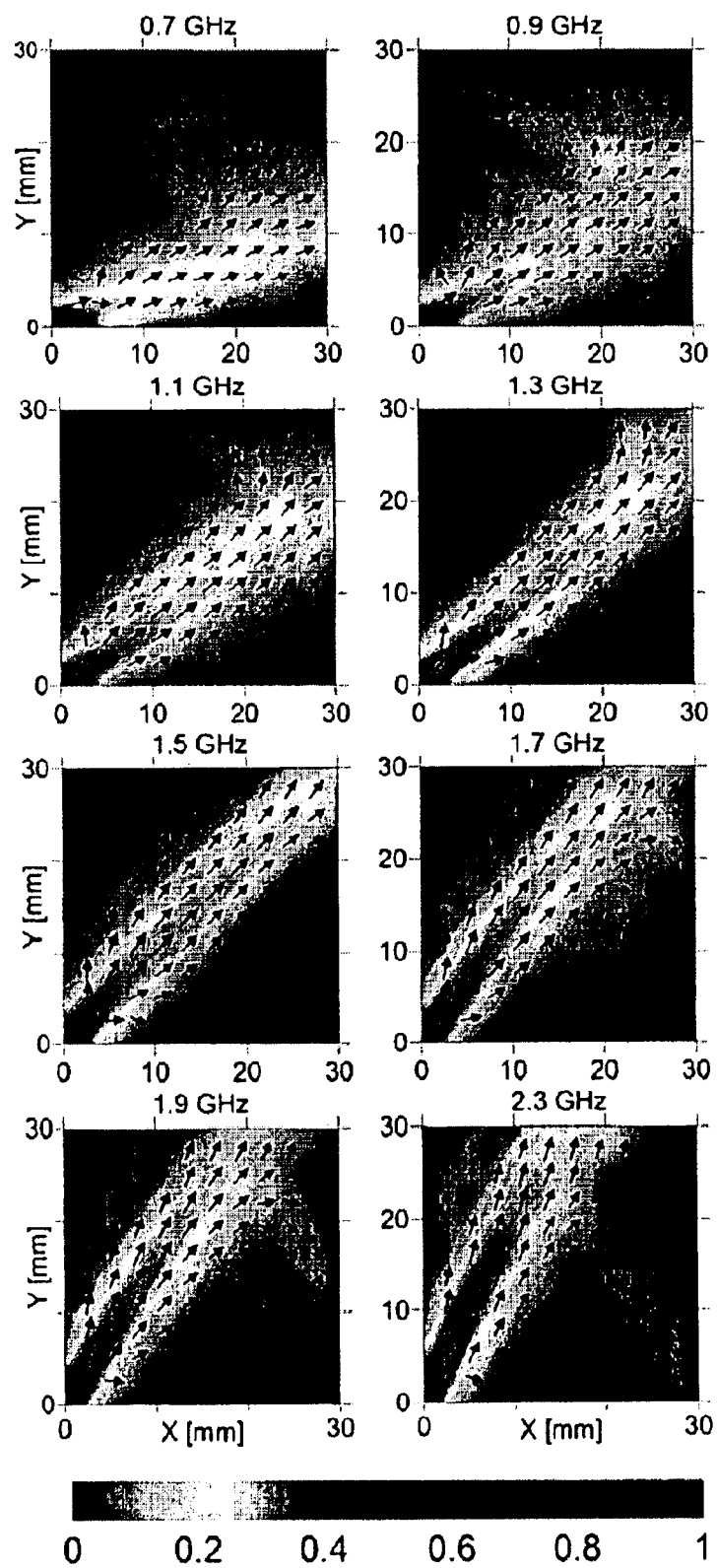
FIG. 22 shows a uniform-grid moment-method simulation displaying corner-fed resonance cones at eight frequencies.
Figure 23:
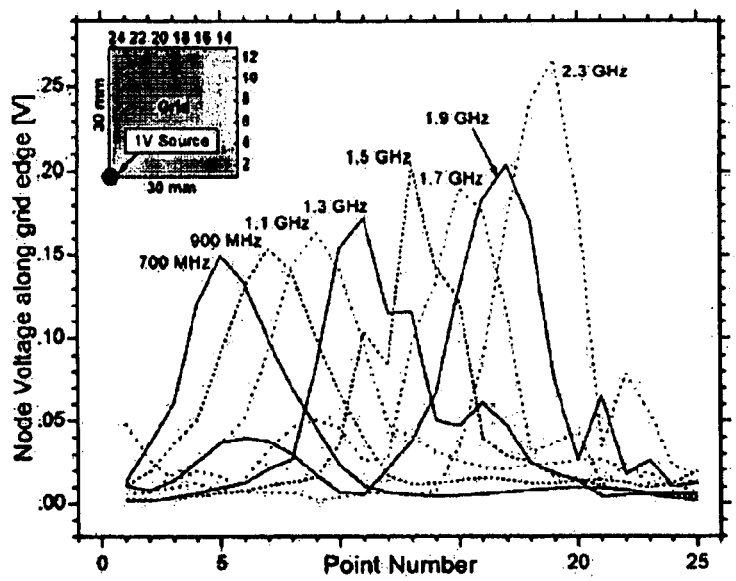
FIG. 23 shows node voltage across 50Ω terminating resistors at numbered points around the edge of the grid of FIG. 21, derived from the simulation data displayed in FIG. 22.

Contour plots of grid-to-ground voltage magnitude and the Poynting vector real parts evaluated from the electric and magnetic fields on the ground-plane level at the center of each unit cell for a corner feed of 1 volt are shown in FIG. 22. The simulated resonance cones and the way the cone orientation scans with frequency over the eight frequencies employed are illustrated. The arrows depict the Poynting vector real parts calculated on the ground plane. From the Poynting vector plot it can be seen that power flow is directed along the resonance cones. Apparent specular reflection from the grid edges is sometimes visible (for example at 0.7, 0.9, 1.9 and 2.3 GHz) but generally it is weak. As well, very weak parasitic resonance cones can be seen in FIG. 22 (for example at 0.9 and 2.3 GHz), probably caused by scattering from the inhomogeneities inherent in the grid structure. FIG. 23 shows the frequency response for the voltages across the 50Ω resistors to ground at all points along two edges of the grid.

Focusing Device Using Two Resonance Cone Metamaterials

Figure 20:
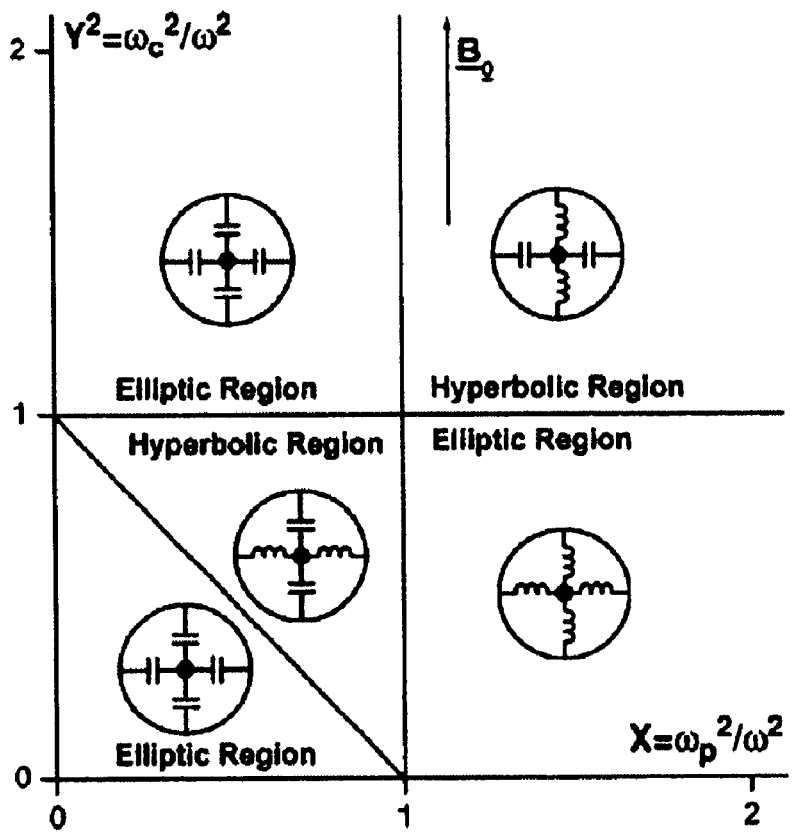
FIG. 20 is a plasma parameter diagram showing elliptic and hyperbolic regions.

Another focusing device making use of resonance cone metamaterial was created using a two media plane including metamaterial similar to that shown in FIG. 11. By interchanging (transposing) the inductors and capacitors in the grid in part of the media, an interface is formed, separating two media. If the plasma negative and positive permittivities are interpreted by representing the media in terms of arrays of inductors and capacitors respectively, then interchanging the inductors and capacitors corresponds to moving the operating point from one hyperbolic region to the other in the parameter space as shown in FIG. 20. The hyperbolic regions characterize the relevant partial differential equation. The vertical axis involves the electron cyclotron frequency $\omega_c$ and is proportional to the square of the ambient magnetic field, while the horizontal axis involves the plasma frequency $\omega_p$ and is proportional to the ambient electron density. The capacitor and inductor symbols characterize the impedance properties of the plasma medium as they effect the input of impedance of a small, spherical RF probe immersed in the plasma medium. These two hyperbolic regions suggest two quite different periodic physical media that, when interfaced, display unusual refraction phenomena. If the inductors and capacitors are regarded as physical entities and not just as aids to interpretation, a physical inductor-capacitor (L-C) network becomes a metamaterial that exhibits a resonance cone phenomena. This enables a two-medium configuration with a linear interface between the original medium and the transpose medium.

Figure 24:
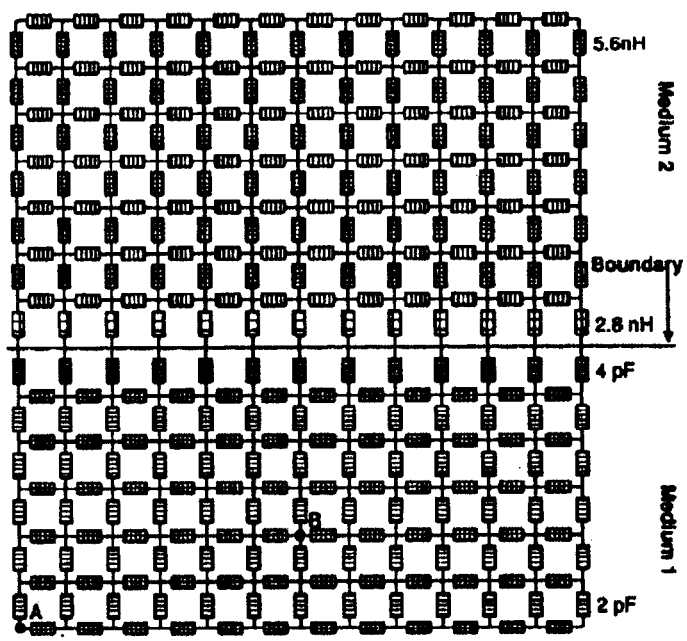
FIG. 24 shows a focusing device in the form of a non-uniform L-C grid, wherein the inductors and capacitors have been transposed in the upper part of the grid and wherein the transition region includes a row of elongated cells.
Figure 25:
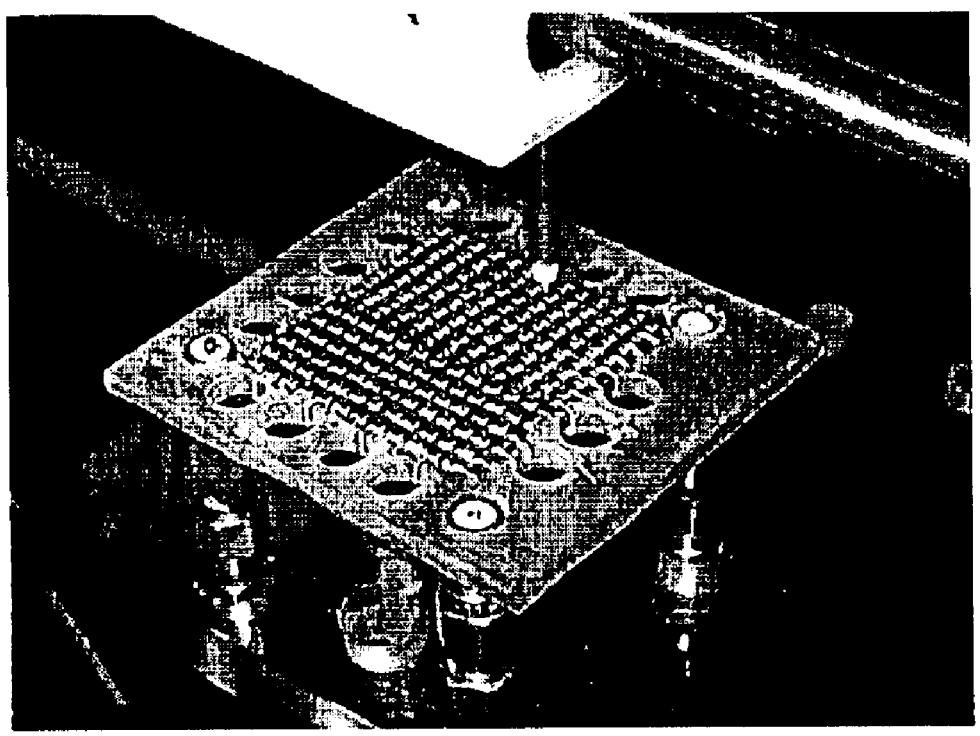
FIG. 25 shows the physical layout of the grid of FIG. 24.

The component layout of a focusing device including multi-resonance cone materials is shown in FIG. 24, and its physical grid realization is shown in FIG. 25 in which the grid elements are chip-type surface-mount inductors and capacitors soldered together. The grid has 12 by 12 unit cells. Medium 1 is constituted by the lower 5 rows of the grid and includes inductors on the horizontal segments and capacitors on the vertical segments. Medium 2 is constituted by the upper 6 rows of the grid and includes capacitors on the horizontal segments and inductors on the vertical segments. The sixth row of cells is the transition region, or interface, where the lower edges of the unit cell carry inductive loads, the upper edges carry capacitive loads, and the vertical segments carry a capacitor on the lower half and an inductor on the upper half. Therefore the boundary between the two media lies in the middle of the transition region.

To accommodate the physical size of the chip-type inductors and capacitors, the unit cells in the transition region are elongated i.e. the vertical dimension is doubled compared to unit cells elsewhere in the grid. The overall size of the grid is 30 mm×32.5 mm and the boundary is a horizontal line 15 mm from the bottom of the grid. The grid is aligned so that individual vertical transmission lines run directly through both media and the interface. In the refraction experiments, the vertical E-field is picked up by an open-ended coaxial probe positioned sequentially just above each conductor intersection, and the probe signal is fed to a network analyzer with output S21 which, when plotted on a linear scale, is approximately proportional to the grid-to-ground voltage.

Figure 26:
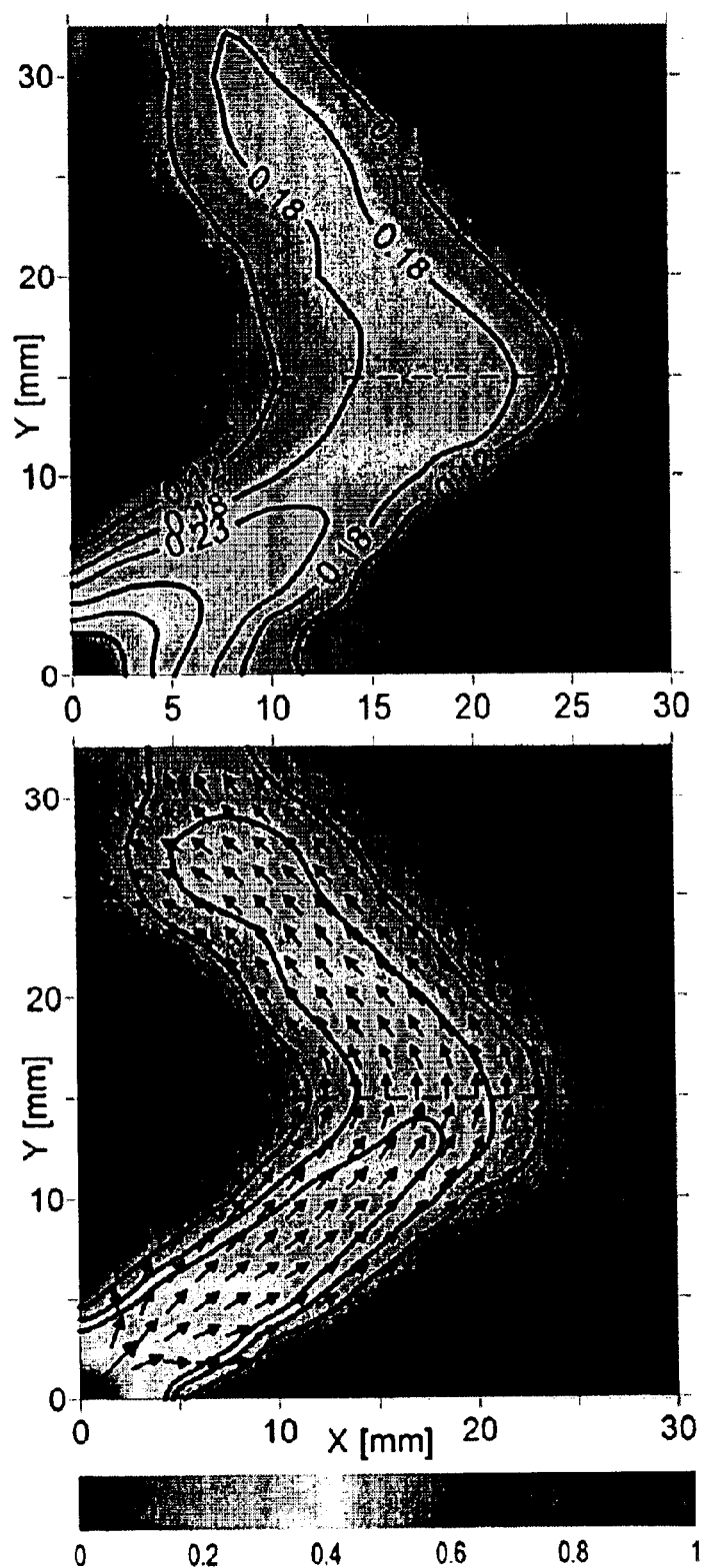
FIG. 26 shows resonance cone refraction at 1.2 GHz.

The two-medium result for corner feed with the feed point being below point A in FIG. 24, is shown in FIG. 26, which displays clearly the negative refraction of the resonance cone as it traverses the transposition interface. Experimental results at the top exhibit contours of normalized /S21/, and the simulation at the bottom exhibits contours of grid-to-ground voltage magnitude with the arrows depicting the Poynting vector real parts on the ground plane. The counter lines in the bottom plot are at the same levels as the three lowest contour lines in the top plot. Notice that specular reflection from the interface is negligible and there is no visible transmission into the second medium in the same direction as the incident cone. This can also be seen from the Poynting vectors in the bottom plot of FIG. 26, which displays the simulation results, where the power flow associated with specular reflection from the interface is negligible and no power along the original resonance cone is transmitted into the second medium. In order to extend the refraction results to include focusing, the physical set-up of FIG. 25 was used with coaxial feed from beneath the ground plane to point B on the grid in FIG. 24, near the middle of one of the two planar metamaterials.

Figure 27:
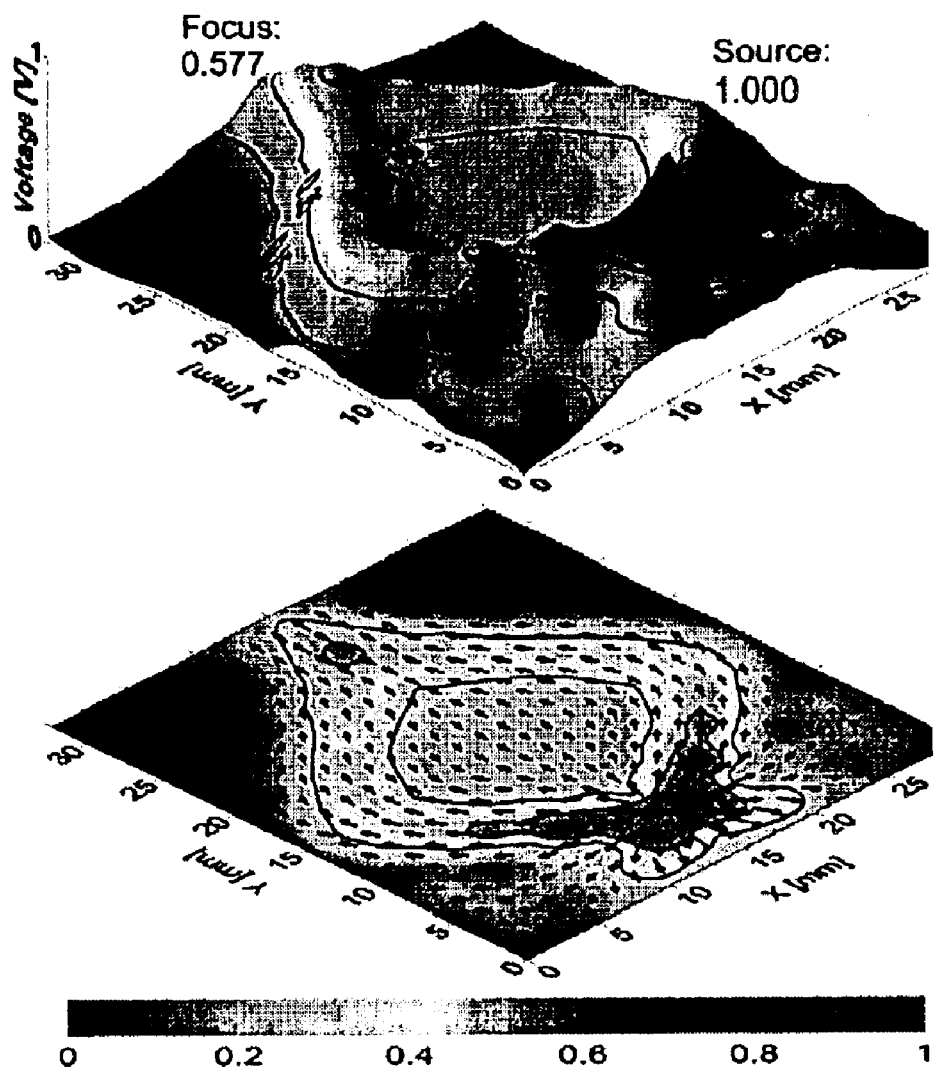
FIG. 27 shows a focusing simulation at 1.3 GHz showing the grid-to-ground voltage magnitude.
Figure 28:
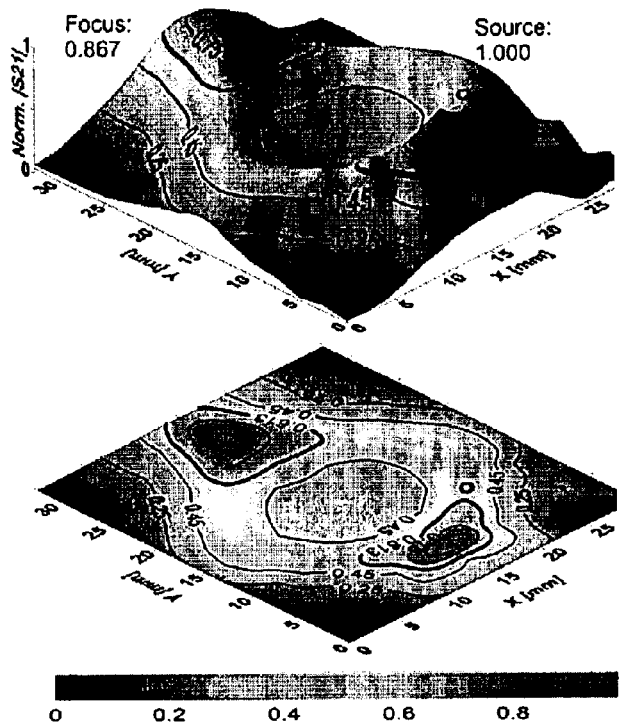
FIG. 28 shows focusing measurements at 1.3 GHz showing the normalized S21 magnitude.
Figure 29:
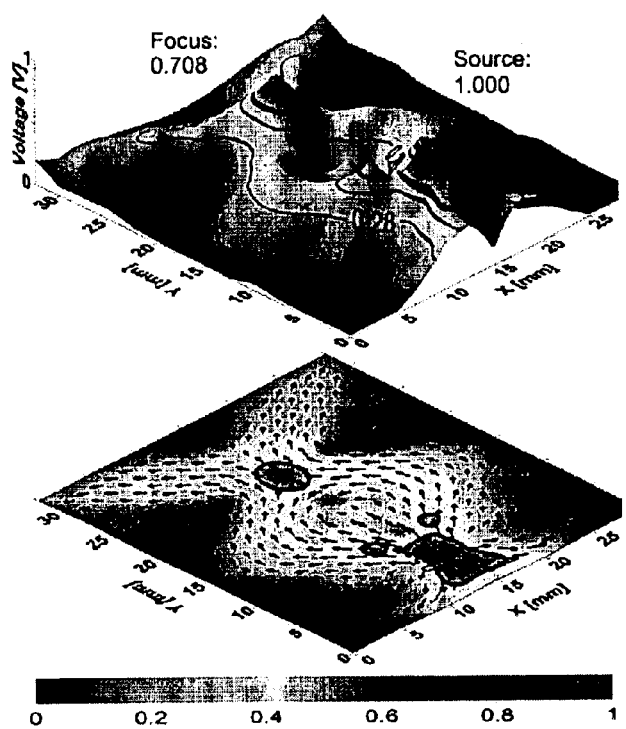
FIG. 29 shows a focusing simulation at 1.7 GHz showing the grid-to-ground voltage magnitude.
Figure 30:
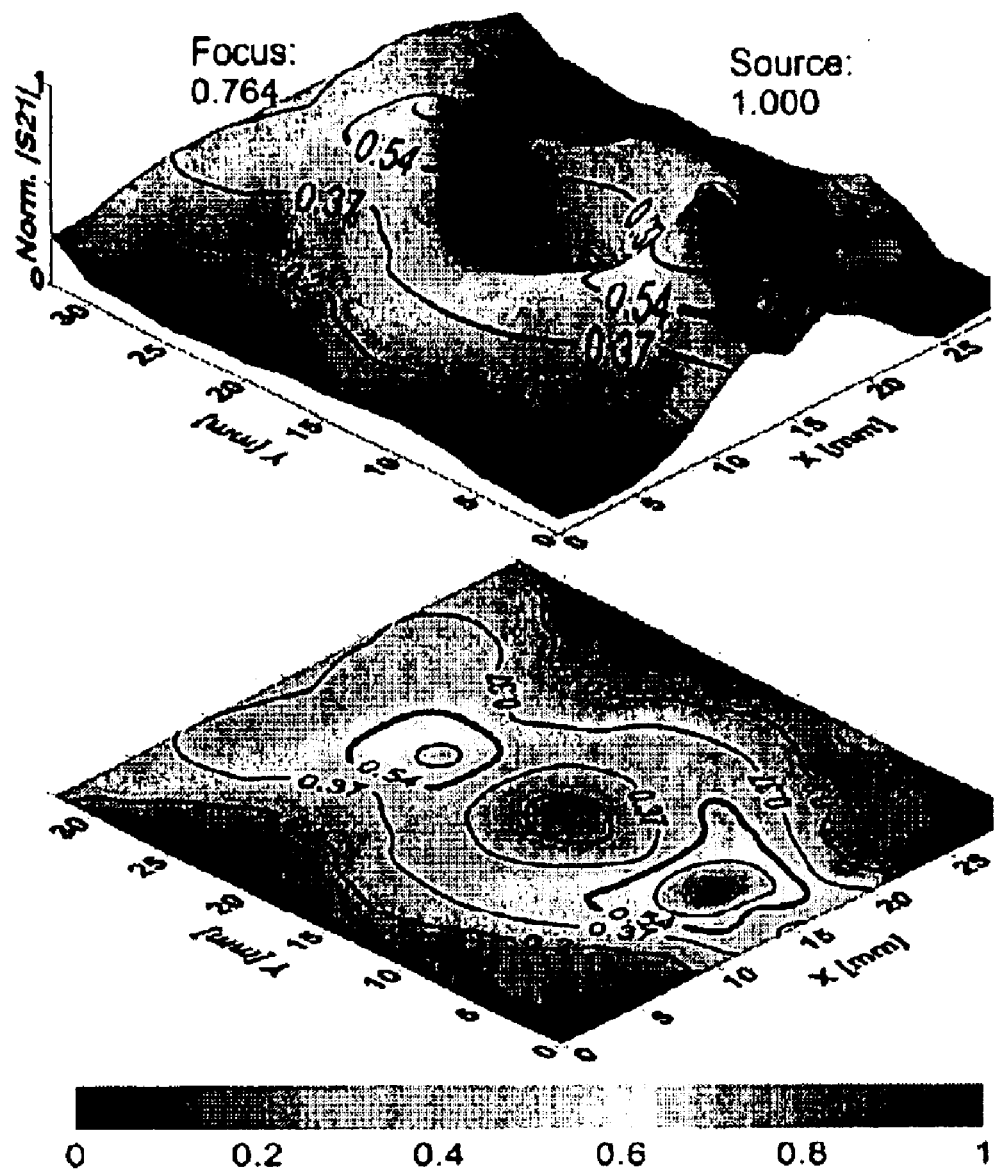
FIG. 30 shows focusing measurements at 1.7 GHz showing the normalized S21 magnitude.

Simulation and experimental results are shown in FIGS. 27 and 28 at 1.3 GH$_z$. The arrows display the Poynting vector real ports calculated on the ground plane. Heavy contour is at 0.707 of focal maximum of 0.867 units of normalized /S21/. Simulation and experimental results are also shown in FIGS. 29 and 30 at 1.7 GH$_z$. In FIG. 29 heavy contour is at 0.707 of focal maximum of 0.708 and in FIG. 30 heavy contour is at 0.707 of focal maximum of 0.764. In all cases, one can see the cones emanating from the feed point (the "source"), the backward refraction at the y=15 mm interface, and the cones merging at the "focus". Note that in FIGS. 27 and 29 the power flow closely follows the directions of the resonance cones. Furthermore, FIG. 29 shows the power flow emanating from the source and following the resonance cones to converge at the focus, from where it diverges again into a new set of resonance cones. In FIGS. 29 and 30, the focal region is taken to be bounded by the contour that is at 0.707 of the focal region maximum, so this contour may be termed the "half-power" contour. It is worth noting, that at 1.7 GHz, the experimental focal region boundary lies within a square measuring ⅕th free-space wavelength on a side, so the phenomenon properly may be termed "sub-wavelength focusing". In contrast, at 1.3 GHz the focal point is too close to the upper edge of the material to exhibit an equally well localized focal region, and thus this represents a useful low-frequency limiting case for the particular overall grid size in use. As well, with increasing frequency, it should be noted that the focal region moves gradually toward the boundary between the two media.

Couplers Using Linear Metamaterials

The present metamaterial is also useful in couplers by combining the metamaterial with conventional microchip (MS) transmission lines. In particular, it has been found that the metamaterial is useful in both a coupled-line coupler and a branch-line coupler. The MS/LHM coupled-line coupler is realized by means of one regular microstrip line that is edge-coupled to a LHM line. Such a coupler excites modes on the two lines whose propagation constants are co-directional but whose corresponding Poynting vectors are contra-directional, leading to backward power coupling. Moreover, by comparison to a conventional coupled-line microstrip coupler of the same length and line spacing, the present MS/LHM coupled-line coupler offers better performance in terms of coupled power, return loss and isolation without any bandwidth degradation. The MS/LHM coupled-line coupler can also be designed for arbitrary backward coupling.

The branch-line coupler uses LHM lines to split power equally between the output ports with interesting phase compensation characteristics. In conventional branch-line couplers, the through and coupled ports are −90° and −180° out of phase respectively with reference to the input port. The present branch-line coupler using an LHM line, results in the power emerging from the coupled port to be in phase with the input port and permits a choice of either positive or negative phase-quadrature (±90°) at the through port.

Figure 31:
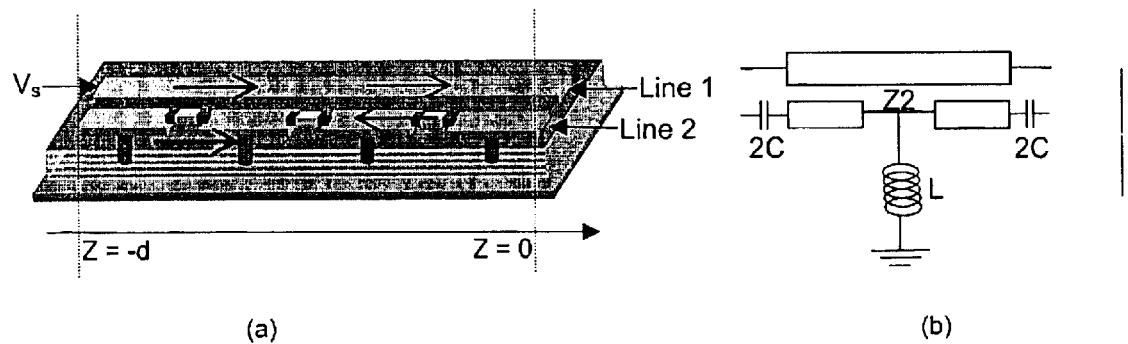
FIG. 31 shows a MS/LHM coupled-line coupler and schematic of a coupler unit cell.

For ease of understanding, the theory behind the coupled-line coupler will be described. A MS/LHM coupled-line coupler can be realized by means of one regular microstrip line that is edge-coupled to a LHM line as shown in FIG. 31. The LHM is synthesized by periodically loading a host microstrip transmission-line (TL) medium with series capacitors and shunt inductors. In such a backward-wave transmission line, the phase velocity and power flow are anti-parallel.

Coupled-line couplers rely on proximity interaction of fields between transmission lines to transfer power between them. In co-directional coupled-line couplers, the direction of the propagation vectors on the two lines is the same. When such couplers are constructed using either two regular or two LHM lines, the underlying propagation phenomenon is fundamentally similar to that on a corresponding isolated line of the same type. Indeed in such co-directional couplers including two lines of the same type, the power also couples co-directionally and appears at the far end of the coupler (i.e. away from the source). Peculiar features arise when two different types of lines are used. Herein it is shown that a MS/LHM coupler excites co-directional forward traveling waves but delivers power backwards as a result of the power flow being contra-directional.

The analysis presented herein assumes that port 1 in FIG. 31(a) is the excited port. The operation of coupled line couplers can be understood in terms of constructive and destructive interference of the two modes that are allowed to propagate. Using a coupled-mode differential-equation formulation, it is possible to show that the general expressions for voltages and currents on the two lines take the form:

$$V_1 = (V_c^+ e^{-j\beta_c z} + V_c^- e^{j\beta_c z}) + (V_\pi^+ e^{-j\beta_\pi z} + V_\pi^- e^{j\beta_\pi z}) \tag{16}$$

$$V_2 = R_c(V_c^+ e^{-j\beta_c z} + V_c^- e^{j\beta_c z}) + R_\pi(V_\pi^+ e^{-j\beta_\pi z} + V_\pi^- e^{j\beta_\pi z}) \tag{17}$$

$$I_1 = \frac{1}{Z_{c1}}(V_c^+ e^{-j\beta_c z} - V_c^- e^{j\beta_c z}) + \frac{1}{Z_{\pi 1}}(V_\pi^+ e^{-j\beta_\pi z} - V_\pi^- e^{j\beta_\pi z}) \tag{18}$$

$$I_2 = \frac{R_c}{Z_{c2}}(V_c^+ e^{-j\beta_c z} - V_c^- e^{j\beta_c z}) + \frac{R_\pi}{Z_{\pi 2}}(V_\pi^+ e^{-j\beta_\pi z} - V_\pi^- e^{j\beta_\pi z}) \tag{19}$$

Subscripts 1 and 2 refer to line 1 (microstrip) and line 2 (LHM) of the coupler respectively; c and π are the two possible modes and the coefficients $R_c$ and $R_\pi$ are the ratios of the voltages on line 2 to line 1 for each mode.

Figure 32:
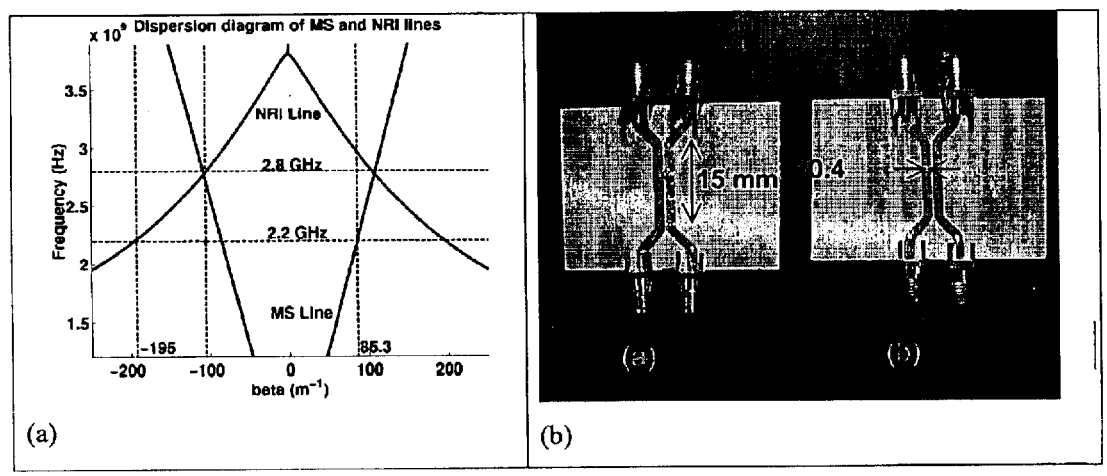
FIG. 32 shows a dispersion diagram for MS and LHM lines used in the coupler of FIG. 31 and photograph of a MS/LHM coupler and a conventional MS/MS coupler of the same length, line spacing and propagation constant.

To analyze the MS/LHM coupler of FIG. 31, some simplifying assumptions are made. First, the lines of the coupler are assumed to the far removed from each other so that the coupled-mode propagation constants $\beta_c$ and $\beta_\pi$ correspond to the isolated propagation constants $\beta_1$ and $\beta_2$ respectively of each line. This implies that $\beta_2$ (LHM line) has a negative value. Hence all occurrences of $\beta_c$ and $\beta_\pi$ in equations (16) to (19) can be replaced by $\beta_1$ and $\beta_2$ respectively. Furthermore line 1 is assumed to be the excited line and therefore, it is anticipated that mode 1 will be the dominant mode for determining the voltage on line 1. Second, to minimize reflections, only the case of properly terminated lines is considered. Thus each mode travels in one direction only. Mode 1, being dominant on line 1, has a forward phase velocity and carries power away from the source. The dilemma lies in the choice of the direction of the phase velocity for mode 2. To resolve this issue, one can consider the limiting case when the magnitudes of the isolated propagation constants of the modes are close to each other. As mode 1 travels forward, due to phase matching constraints, it is expected that the coupled mode (mode 2 in this case) should also travel forward. The present situation is the reciprocal case and therefore, power from the excited regular MS line will couple backwards into port 2 of the LHM line (see FIG. 31(*a*)). In the general case when the two mode propagation constants are not close to each other, maximum power can be coupled backwards into port 2 (see FIG. 32(*a*)) only when the excited modes are co-directional. Hence in the following discussion, only the case of co-directional (phase-wise) coupled modes will be considered.

Lastly, it is assumed that the magnitudes of the impedances for each mode on line 1 are the same and are denoted by $Z_1$; similarly for line 2 they are denoted by $Z_2$. Caution must be exercised in choosing the signs of the impedances in the current equations 3 and 4. The impedance term in front of $V_c^+$ and $V_c^-$ (equation 3) will be positive as usual. Since $V_\pi^+$ and $V_\pi^-$ (equation 3) actually correspond to backward and forward traveling waves respectively on line 1 (due to the negative sign of $\beta_2$), and to ensure that the power carried by a forward traveling wave in a regular medium is also forward, $Z_{\pi 1}$ should be negative. Similar arguments applied to line 2 (LHM line) require that the sign of $Z_{c2}$ be negative and that of $Z_{\pi 2}$ be positive to ensure that power flow and phase flow occur in opposite directions.

With these assumptions, equations (16) to (19) can be simplified to:

$$V_1 = V_c^+ e^{-j\beta_1 z} + V_\pi^- e^{j\beta_2 z} \tag{20}$$

$$V_2 = R_c V_c^+ e^{-j\beta_1 z} + R_\pi V_\pi^- e^{j\beta_2 z} \tag{21}$$

$$I_1 = \frac{V_c^+}{Z_1} e^{-j\beta_1 z} + \frac{V_\pi^-}{Z_1} e^{j\beta_2 z} \tag{22}$$

$$I_2 = -\frac{R_c}{Z_2} V_c^+ e^{-j\beta_1 z} - \frac{R_\pi}{Z_2} V_\pi^- e^{j\beta_2 z} \tag{23}$$

Applying boundary conditions at port 1 (presence of source $V_s$ and matching source impedance $Z_1$) and port 4 (termination to $Z_2$) respectively yields:

$$V_c^+ e^{j\beta_1 d} + V_\pi^- e^{-j\beta_2 d} = \frac{V_s}{2} \tag{24}$$

$$R_c V_c^+ + R_\pi V_\pi^- = 0 \tag{25}$$

Solving for $V_c^+$ and $V_\pi^-$, and plugging back into equations (20) and (21), the following expressions for the line voltages along the coupler can be obtained:

$$V_1(z) = \frac{V_s}{2} \frac{R_\pi e^{-j\beta_1 z} - R_c e^{j\beta_2 z}}{R_\pi e^{j\beta_1 d} - R_c e^{-j\beta_2 d}} \tag{26}$$

$$V_2(z) = \frac{V_s}{2} \frac{R_\pi R_c (e^{-j\beta_1 z} - e^{j\beta_2 z})}{R_\pi e^{j\beta_1 d} - R_c e^{-j\beta_2 d}} \tag{27}$$

Equations (26) and (27) confirm that port 4 (z=0) is the isolated port and port 2 (z=−d) is the coupled port. Expressions for power delivered to the through port (port 3) and coupled port (port 2) can be derived from equations (26) and (27):

$$P_2 = \frac{1}{Z_2} \left(\frac{V_s}{2}\right)^2 \frac{(R_C R_\pi)^2 (1 - \cos((\beta_1 + \beta_2)d))}{(R_c^2 + R_\pi^2 - 2 R_c R_\pi \cos((\beta_1 + \beta_2)d))} \tag{28}$$

-continued $$P_3 = \frac{1}{2Z_1} \left(\frac{V_s}{2}\right)^2 \frac{(R_C - R_\pi)^2}{(R_c^2 + R_\pi^2 - 2 R_c R_\pi \cos((\beta_1 + \beta_2)d))} \tag{29}$$

From equation (29) it can be seen that the power delivered to the through port (port 3) is minimized (i.e. the power to the coupled port is maximized) when the argument of the cosine function in the denominator takes values which are odd integer multiples of $\pi$. This allows the definition of the coherence length of the coupler, which is the optimal length for maximum coupling, as:

$$d_{coherence} = \pi/|\beta_1 + \beta_2| \tag{30}$$

Note that in the above equation (30), $\beta_2$ is negative. An interesting feature of such a coupler is that it is possible to achieve arbitrary backward coupling by making the magnitudes of the propagation constants of the two modes close to each other.

Two coupled-line couplers were constructed, namely a short MS/LHM coupled-line coupler and a long MS/LHM coupled-line coupler with arbitrary coupling. The substrate used to construct the couplers was a low-loss Rogers™ TMM4® having a relative dielectric constant $\in_r$=4.6 and 50 mils thickness (loss tangent=0.002). The regular MS lines were designed using a microwave-circuit simulator, whereas Matlab® simulations of the dispersion relation of the periodic LHM line were performed to estimate the corresponding propagation constant at the design frequency. Moreover, microwave circuit simulations of the couplers were performed using a microwave-circuit simulator.

The short MS/LHM coupled-line coupler was designed with a finite coherence length to demonstrate the validity of the theory. The long MS/LHM coupled-line coupler has magnitudes of the two modal propagation-constants close to each other. By taking a finite number of cells (the optimal length infinite as defined by equation 15), a comparison with a conventional (MS/MS) coupled-line microstrip coupler of the same length, line spacing, and propagation constant is permitted.

Using a microwave circuit simulator the widths of the lines of the short MS/LHM coupled-line coupler are designed so that both the MS and LHM lines have an impedance of 50Ω when placed 0.4 mm apart. The width of the MS and LHM lines used was 2.383 mm. Using a unit cell size of 5 mm for the LHM line, the choice of the loading elements are 2.7 nH shunt inductors and 0.9 pF series capacitors. Again, the microwave circuit simulator is used to determine the effective dielectric constant for the line segments. This is used in Matlab simulations of the periodically loaded transmission-line based LHM line to extract its dispersion characteristics (see FIG. 32(*a*)). A design frequency of 2.2 GHz is selected for this configuration so that the magnitude of the isolated propagation constants differ enough (see FIG. 32(*a*)) to give a short coherence length (see equation 15).

Figure 33:
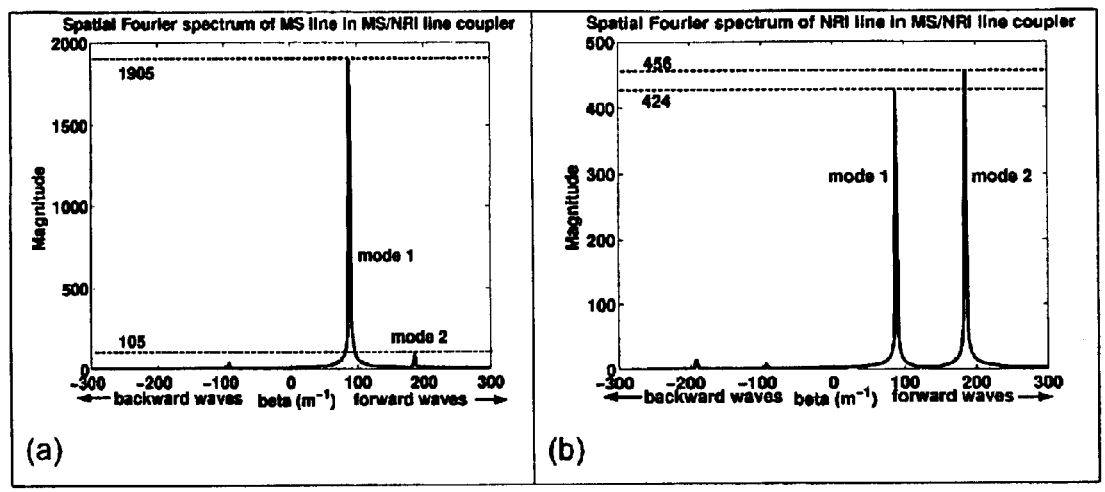
FIG. 33 shows a spatial Fourier transform of line voltages on the MS line and LHM line of the MS/LHM coupled-line coupler of FIG. 31.
Figure 34:
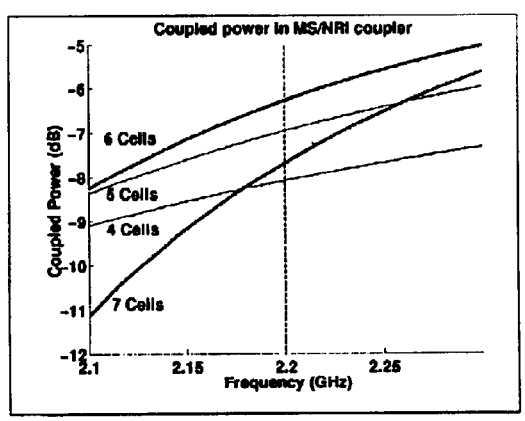
FIG. 34 shows the coherence length of the MS/LHM coupled-line coupler of FIG. 31.

A spatial Fourier transform of the line voltages, extracted by exciting port 1 in ADS simulations, is shown for both lines of the coupled-line coupler at 2.2 GHz using 400 sample points (see FIGS. 33(*a*) and (*b*)). These plots demonstrate the validity of the assumption that the propagation constants of the coupled modes ($|\beta_1|$=85.3 m$^{-1}$ and $|\beta_2|$=195 m$^{-1}$) are indeed close to the isolated propagation constants of the individual lines (compare to FIG. 32(*a*)). Moreover the Fourier spectrum demonstrates that both modes propagate forward (co-directional) and that $\beta_1$ is dominant on line 1 (MS). Furthermore, the assumption of minimal reflections is evident from the small peaks in the negative region of the spectrum in FIGS. 33(a) and 33(b). In addition, using equation (30), the coherence length is calculated to be 28.6 mm and can be approximated by 6 unit cells of the MS/LHM coupled-line coupler. By comparing the coupled power as a function of frequency for various coupler sizes, this is verified to be true as shown in FIG. 34. Moreover, the input power at port 1 is $V_s^2/8Z_0$ and the output power at the coupled port is given by equation (28). The implicated voltage ratios $R_c$ and $R_\pi$ can be estimated from FIGS. 33(a) and 33(b) and the corresponding theoretical value for the coupled power ($S_{21}$) amounts to −7.46 dB at the coherence length, which is close to the simulation results for a 6 unit cell long coupler (see FIG. 34).

Fair comparison between a conventional coupled-line backward coupler (MS/MS) and a metamaterial long MS/LHM coupled-line coupler (see FIG. 32(b)) can be made if their propagation constants and line impedances are similar. This is because, it is always possible to slow down the coupled waves and improve coupling in conventional couplers by loading them. For this purpose, a design frequency of 2.8 GHz (FIG. 32(a)) is selected. The widths of the MS and LHM strips of the MS/LHM coupled-line coupler are taken to be 2.45 mm and 2.0 mm respectively so that at a line separation of 0.4 mm at the design frequency, the impedances of each line are close to 50Ω. The loading elements are the same as above with reference to the short MS/LHM coupled-line coupler.

A regular MS/MS backward coupler was also designed at the same frequency with a propagation constant of 108.2 $m^{-1}$ and impedance close to 50Ω. The widths of the strips were taken to be 2.122 mm in this case and the length of the coupler was optimized to 14.5 mm ($\lambda/4$).

From MATLAB® simulations of the periodic LHM lines (see FIG. 32(a)) it is found that at 2.8 GHz, the propagation constants for both lines of the MS/LHM coupled-line coupler are similar to those of the MS/MS coupler lines (MS and LHM propagation constants are 108.9 $m^{-1}$ and 105 $m^{-1}$ respectively). This makes the coherence length for the MS/LHM coupled-line coupler very long (equation 15). For comparison with the designed conventional MS/MS coupler, the former is constructed out of 3 unit cells corresponding to a total length of 15 mm (see FIG. 32(b)).

From theory (equation (15)) it is anticipated that this MS/LHM coupled-line coupler will have a long coherence length if the propagation constants of its two modes are close to each other. This is true at 2.8 GHz as shown in the dispersion diagram for the LHM-line (see FIG. 31(a)).

Figure 35:
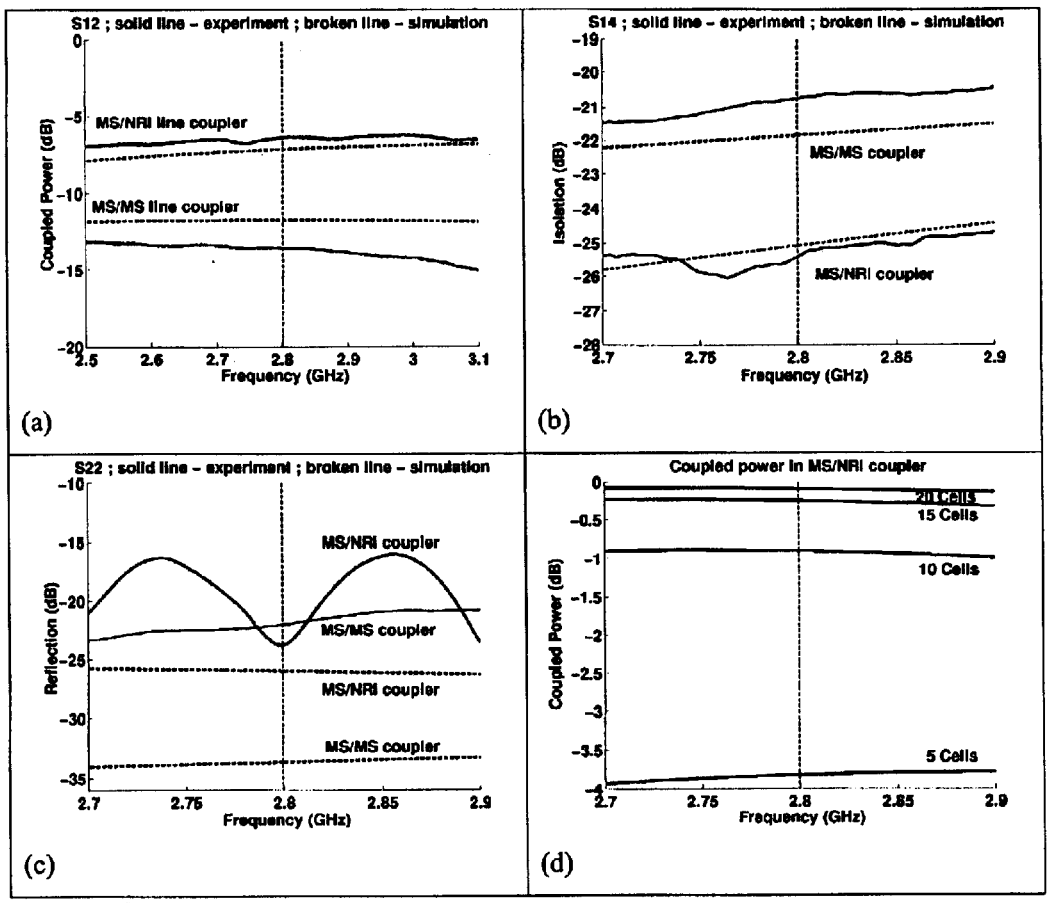
FIG. 35 shows a comparison of a MS/MS coupler with a MS/LHM coupler of the same length, line spacing and propagation constant for coupled power, isolation, reflection, and arbitrary coupling.

For comparison with a conventional MS/MS backward coupler, simulation and experimental results are presented in FIGS. 35(a) to 35(c), involving a $\lambda/4$ MS/MS coupler and a 3 unit cell long MS/LHM coupled-line coupler, both of approximately equal lengths, equal spacing and propagation constants (see FIG. 32(b)). The return loss ($S_{11}$), isolation ($S_{41}$) and coupled power ($S_{21}$) for each coupler were measured using a HP8753D network analyzer and values obtained were compared to microwave-circuit simulation results. As shown in FIG. 35(a), the coupled power of the MS/LHM coupled-line coupler is better than that of the MS/MS coupler. Furthermore, from FIG. 35(b), it is seen that the amount of power leaking into the isolated port of the MS/LHM coupled-line coupler is lower than that of the corresponding MS/MS coupler. In addition, at the design frequency, the return loss of the MS/LHM coupled-line coupler is lower than its conventional counterpart (see FIG. 35(c)). Hence, the metamaterial MS/LHM coupled-line coupler exhibits superior performance in terms of the coupled power, isolation and return loss when compared to a conventional MS/MS coupler of the same length, line separation and propagation constant.

As expected from the dispersion analysis and the theory presented earlier, the MS/LHM coupled-line coupler has a very large coherence length. Under such conditions, arbitrary coupling can be achieved as demonstrated in FIG. 35(d). As the number of unit cells is increased, the coupled power improves and it is possible to achieve close to 0 dB coupled power.

Overall, there is good agreement between theory, simulation and experiment. The predictions of the coherence length as well as the level of the coupled power agree well with the experimentally observed results. The coupled-line coupler demonstrates better performance in terms of coupling, isolation and reflection when compared to a conventional microstrip coupler of the same length, line spacing and propagation constant.

Small discrepancies between simulation and experimental results can be attributed to a number of factors. The absence of accurate models for the inductors used and their self-resonance characteristics affect the design. Moreover chip components with finite dimensions add to the overall electrical length of the MS/LHM coupler which needs to be properly accounted for.

In conventional microstrip branch-line couplers, power splits equally between the through and coupled ports and the ports are −90° and −180° out of phase respectively with reference to the input port. Interesting phase compensation effects can be achieved when some of the branches of the branch-line couplers are replaced by LHM lines.

Two different branch-line coupler designs are presented below denoted as type 1 and type 2. The type 1 branch-line coupler uses regular microstrip lines for the low-impedance branches and LHM lines for the high-impedance branches (see FIG. 36(a)). The type 2 branch-line coupler is the dual of the type 1 branch-line coupler and utilizes LHM lines for the low-impedance branches and microstrip lines for the high-impedance branches (see FIG. 36(b)). For both branch-line couplers, power splits equally between the two output ports with a 0°-phase shift with respect to the input at the coupled port. Furthermore, the type 1 branch-line coupler offers a negative phase quadrature (−90°) while the type 2 branch-line coupler provides a positive phase quadrature (+90°) at the through port with respect to the input port.

Figure 36:
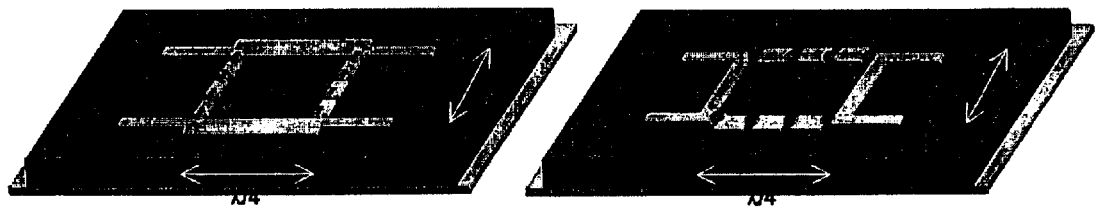
FIG. 36 shows MS/LHM branch-line couplers.

FIG. 36(a) shows the structure of the type 1 branch-line coupler made of alternating MS and LHM lines. The scattering parameters of the coupler can be determined using even-odd mode analysis. It can be easily shown that the impedance looking into a segment of LHM transmission line of length d is given by:

$$Z_{in} = Z_0 \frac{Z_L + jZ_0 \tan\beta d}{Z_0 + jZ_L \tan\beta d} \quad (31)$$

where:
$Z_L$ is the load impedance at the end of the line;
$Z_0$ is its characteristic impedance; and
$\beta$ is a negative number corresponding to the propagation constant.

For the purpose of analysis, port 1 is excited by a source $V_s$ of internal impedance $Z_0$ and all other ports are terminated at $Z_0$. In the even mode analysis, both port 1 and port 2 are excited by $V_s/2$ sources. In the odd mode, the source at port 1 is $V_s/2$ and the source at port 2 is $-V_s/2$ (see FIG. 37).

In the even mode, looking down the LHM lines at port 1 and port 3 (see FIG. 36(a)), one sees open $\lambda/8$ lines and hence βd is −π/4. From equation (31), this corresponds to shunt loading of the λ/4 MS line at its ends by a susceptance −jY$_0$ (see FIG. 37). In the odd mode, one can observe shorted λ/8 segments of LHM lines instead, corresponding to shunt loading of the MS line by a susceptance jY$_0$.

Figure 37:
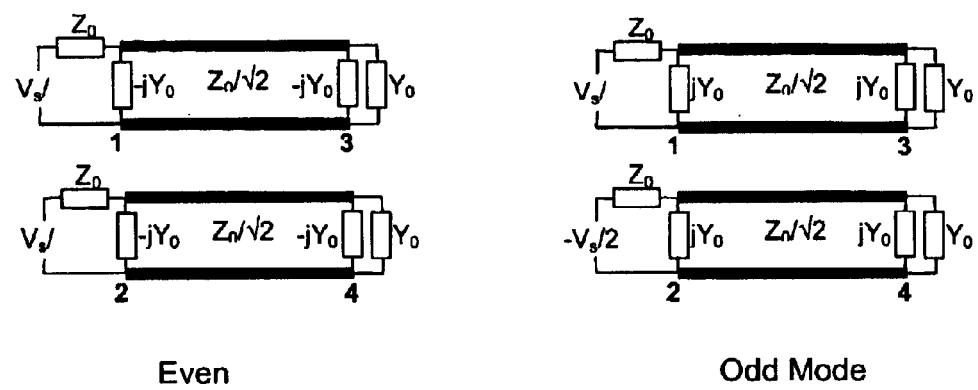
FIG. 37 shows even/odd mode equivalent circuits of a type 1 MS/LHM branch-line coupler.

By analyzing the equivalent circuits in FIG. 37, it is seen that the impedance looking into each port is Z$_0$. Since the ports are always matched, S$_{11}$, S$_{22}$, S$_{33}$ and S$_{44}$ are zero. As the waves in each port travel in only one direction, by superposition of the even and odd modes, S$_{21}$ is zero. In the even mode, the signal at port 1 can be related to the signal at port 3 by the following transfer matrices:

$$\begin{bmatrix} V_s/4 \\ I_1 \end{bmatrix} = \begin{bmatrix} 1 & 0 \\ -jY_0 & 1 \end{bmatrix} \begin{bmatrix} 0 & j\frac{Z_0}{\sqrt{2}} \\ jY_0\sqrt{2} & 0 \end{bmatrix} \begin{bmatrix} 1 & 0 \\ -jY_0 & 1 \end{bmatrix} \begin{bmatrix} V_3 \\ V_3 Y_0 \end{bmatrix} \quad (32)$$

$$\Leftrightarrow V_3^{even} = \frac{1}{\sqrt{2}} \frac{V_s}{4}(1-j) = V_4^{even} \quad (33)$$

In the even mode, the voltage at port 3 and port 4 are identical (see FIG. 37). In the odd mode, the transfer matrices are:

$$\begin{bmatrix} V_s/4 \\ I_1 \end{bmatrix} = \begin{bmatrix} 1 & 0 \\ jY_0 & 1 \end{bmatrix} \begin{bmatrix} 0 & j\frac{Z_0}{\sqrt{2}} \\ jY_0\sqrt{2} & 0 \end{bmatrix} \begin{bmatrix} 1 & 0 \\ jY_0 & 1 \end{bmatrix} \begin{bmatrix} V_3 \\ V_3 Y_0 \end{bmatrix} \quad (34)$$

$$\begin{bmatrix} -V_s/4 \\ I_2 \end{bmatrix} = \begin{bmatrix} 1 & 0 \\ jY_0 & 1 \end{bmatrix} \begin{bmatrix} 0 & j\frac{Z_0}{\sqrt{2}} \\ jY_0\sqrt{2} & 0 \end{bmatrix} \begin{bmatrix} 1 & 0 \\ jY_0 & 1 \end{bmatrix} \begin{bmatrix} V_4 \\ V_4 Y_0 \end{bmatrix} \quad (35)$$

$$\Leftrightarrow V_3^{odd} = -\frac{1}{\sqrt{2}} \frac{V_s}{4}(1+j); \; V_4^{odd} = \frac{1}{\sqrt{2}} \frac{V_s}{4}(1+j) \quad (36)$$

where equation (34) is the transfer matrix from port 1 to port 3 and equation (35) is the transfer matrix from port 2 to port 4 (see FIG. 37). The amplitude of the total incident voltage (odd and even) at port 1 is V$_s$/2. Hence from superposition of the modes, S$_{31}$ and S$_{41}$ are equal to −j/√2 and 1/√2 respectively. The scattering matrix for the MS/LHM branch-line coupler is:

$$\begin{bmatrix} V_1^- \\ V_2^- \\ V_3^- \\ V_4^- \end{bmatrix} = \frac{1}{\sqrt{2}} \begin{bmatrix} 0 & 0 & -j & 1 \\ 0 & 0 & 1 & -j \\ -j & 1 & 0 & 0 \\ 1 & -j & 0 & 0 \end{bmatrix} \begin{bmatrix} V_1^+ \\ V_2^+ \\ V_3^+ \\ V_4^+ \end{bmatrix} \quad (37)$$

From equation (37), it is seen that in the MS/LHM branch-line coupler, the power divides equally between the through port (port 3) and coupled port (port 4) and they are 90° and 0° out of phase respectively with reference to the input (port 1).

To construct the type 1 branch-line coupler a substrate similar to that of the coupled-line couplers was used. In the type 1 branch-line coupler, the MS strips have an impedance of 50/√2Ω whereas LHM strips have an impedance of 50Ω (using a microwave-circuit simulator). The design frequency is chosen to be 1.9 GHz so that each side of the coupler is λ/4 long (from Matlab® simulations of the dispersion characteristics of the line). The MS line used is 4.018 mm wide and 20.603 mm long. The LHM-line strip comprises 3 unit cells of width 2.343 mm and length 5.2 mm each. The latter is loaded with 3.3 nH shunt inductors and 1.6 pF series capacitors. The end capacitors of each LHM line segment are 2.4 pF. The terminating capacitors are chosen to be almost twice the value of the interior ones to preserve the symmetry of the unit cells making up the LHM lines (see FIG. 31(b)).

During simulation, port 1 of the branch-line coupler shown in FIG. 36(a) is excited in a microwave-circuit simulation and all other ports are terminated with 50Ω loads. The reflected power (S$_{11}$), isolation (S$_{21}$), through power (S$_{31}$) and coupled power (S$_{41}$) are recorded and compared to theoretical estimates from even-odd mode analysis. To apply the previously presented even-odd mode analysis, Matlab® simulations are performed for both lines to determine their dispersion characteristic. Subsequently, the corresponding phase shifts are used in the even-odd mode analysis. These theoretical results are compared with a microwave-circuit simulation and are presented in FIGS. 38(a) to 38(c).

Figure 38:
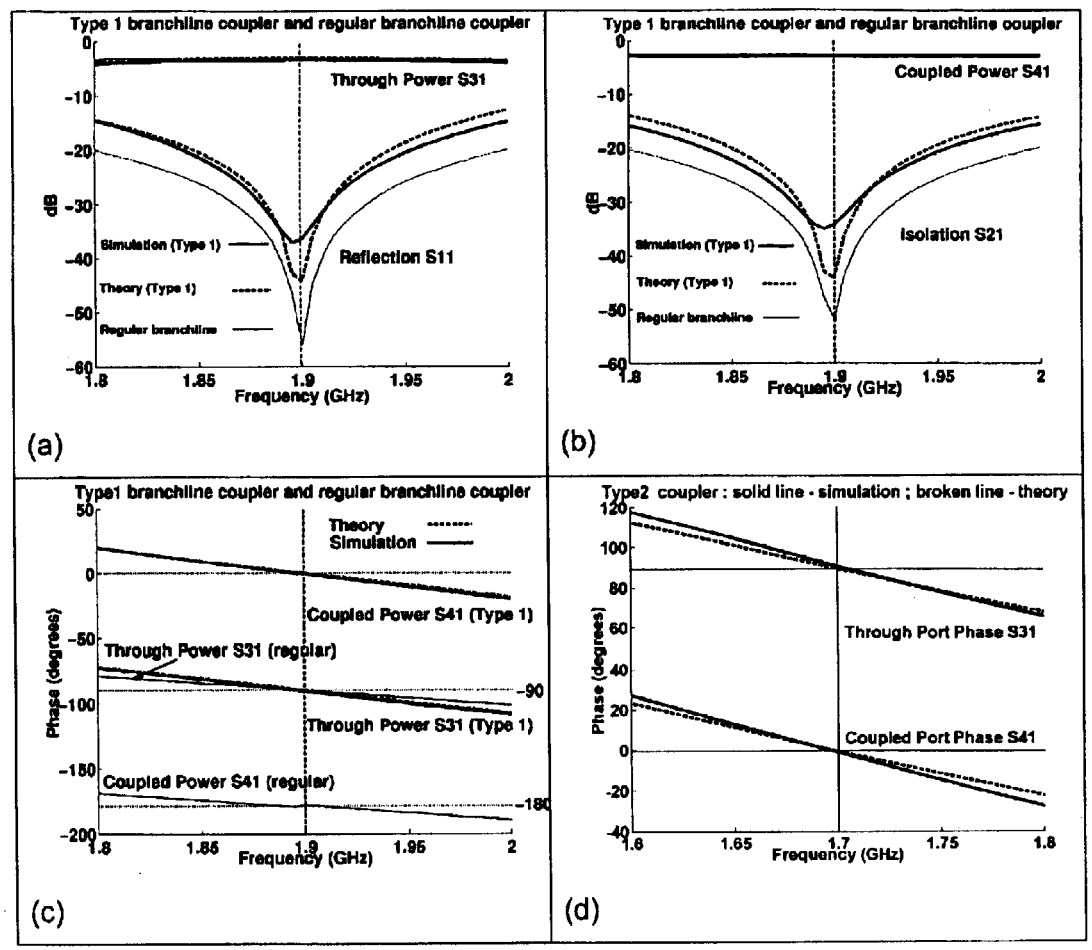
FIGS. 38a to 38d show scattering parameters of type 1 MS/LHM branch-line couplers compared to a regular branch-line coupler and scattering parameters of a type 2 MS/LHM branch-line coupler.

In this branch-line coupler, the input power splits in half between the through port (port3) and coupled port (port 4) as expected (see equation (22)). This is demonstrated in FIGS. 38(a) and 38(b). FIGS. 38a and 38b also show that at the design frequency, the through and coupled ports are matched (see S$_{11}$ in FIG. 38(a)) and port 2 is isolated (see FIG. 38(b)). In FIGS. 38(a) and 38(b) the response of a commensurate, conventional, branch-line coupler is also included for comparison purposes. As shown, there is no degradation of the useful bandwidth between the conventional and the type 1 branch-line coupler. However, from theory the through port (port 3) undergoes a phase shift of −90° and the coupled port (port 4) undergoes a phase shift of 0° with respect to the input. This is clearly demonstrated from the simulation results in FIG. 38(c).

The schematic for the type 2 MS/LHM branch-line coupler is shown in FIG. 36(b). The scattering parameters for this branch-line coupler can be determined in the same way followed for the type 1 case. Since in this branch-line coupler, the MS and LHM lines are switched, every occurrence of j in equations (32) to (37) is replaced by −j. Hence the scattering matrix for the type 2 MS/LHM branch-line coupler is:

$$\begin{bmatrix} V_1^- \\ V_2^- \\ V_3^- \\ V_4^- \end{bmatrix} = \frac{1}{\sqrt{2}} \begin{bmatrix} 0 & 0 & j & 1 \\ 0 & 0 & 1 & j \\ j & 1 & 0 & 0 \\ 1 & j & 0 & 0 \end{bmatrix} \begin{bmatrix} V_1^+ \\ V_2^+ \\ V_3^+ \\ V_4^+ \end{bmatrix} \quad (38)$$

From equation (38), it is seen that in the type 2 MS/LHM branch-line coupler, the power divides equally between the through port (port 3) and coupled port (port 4) and the parts are +90° and 0° out of phase respectively with reference to the input (port 1).

For the type 2 branch-line coupler, the LHM strips are designed with 50/√2Ω impedance and the MS strips with 50Ω impedance. The design frequency is chosen at 1.7 GHz so that again all sides are λ/4 long. In this case, the MS lines used are 2.342 mm wide and 23.645 mm long. The LHM-line strip comprises 3 unit cells of width 4.017 mm and length 5 mm each. The latter is loaded with 2.7 nH shunt inductors and 2.4 pF series capacitors, with terminating 4 pF capacitors for the LHM lines.

The type 2 branch-line coupler splits the input power equally between the two forward ports (through and coupled) and the backward port is isolated. As will be appreciated, the magnitude response is very similar to that of the type 1 branch-line coupler. From theory (equation (23)) and verified from the simulation results in FIG. 38(d), the through port (port 3) undergoes a phase shift of 90° and the coupled port (port 4) undergoes a phase shift of 0° with respect to the input.

A conventional branch-line coupler allows for equal power split between the output ports but with −90° and −180° phase shifts with respect to the input (see FIGS. 38(a) to 38(c)). As will be appreciated, the present branch-line couplers offer more options in the design of circuits involving branch-line couplers. than available with conventional branch-line couplers. Specifically either a positive or a negative phase quadrature at the through port can be achieved, associated with a phase compensation at the coupled port.

The present coupled-line coupler demonstrates superior performance in terms of coupling, isolation and return loss when compared to a conventional microstrip coupled-line coupler of the same length, line spacing and propagation constant. Moreover, it is possible to realize such MS/LHM coupled-line couplers to achieve an arbitrary coupling coefficient. Furthermore, MS/LHM branch-line couplers possess similar functionality to their conventional counterparts when considering the magnitude of the power transfer between the ports. However, new functionality is added by the ability to obtain phase compensation at the coupled port (0° phase shift with respect to the input) along with a choice of either a positive or a negative phase quadrature (±90° phase shift) at the through port. On the other hand, the corresponding bandwidth remains comparable to that of conventional, commensurate, microstrip branch-line couplers.

Backward Leaky-Wave Antenna Using Metamaterial

Charged particles traveling at speeds greater than the phase velocity of light in a medium emit coherent radiation better known as Cherenkov radiation. The angle of the radiated conical wave front is given by the velocity of the particle (V) with respect to the phase velocity of EM waves (v) within the medium in the following manner:

$$\text{Cos}(\theta) = v/V = \frac{c/n_0}{V} \quad (39)$$

where:

$n_0$ is the refractive index of the surrounding medium;

c is the speed of light in a vacuum; and

θ is the angle between the particle velocity and the radiated EM wave front.

This expression suggests that in a medium with negative no, the angle θ becomes obtuse. This implies that radiation is directed backward rather than forward, as is the case in a RHM.

Similarly, if a periodic guiding structure supports Bloch currents (moving charge) or equivalently EM waves with phase velocities greater than the speed of light, the angle of the radiated wave front is derived from equation (39) by letting V be the phase velocity of the EM wave along the guiding interface. This is due to the phase matching condition along the interface of the guide and surrounding medium. If the guiding structure is a medium with an effective refractive index $n_1$, and the surrounding medium has a refractive index $n_0$, then the angle of the radiated wave front is given by the following expression:

$$\text{Cos}(\theta) = \frac{c/n_0}{c/n_1} = \frac{n_1}{n_0} \quad (40)$$

The above equation indicates that if the refractive index of the guiding medium ($n_1$) is negative, the radiation emitted into a RHM will be directed backward. It is in fact the phase advancement (backward-wave propagation) that causes backward radiation into the surrounding medium.

In order to excite backward-wave radiation from a dual transmission line LHM into free space, the L, C parameters need to be chosen such that the effective refractive index of the LHM, ($n_1$), is negative and smaller in magnitude than one, as indicated by equation (40). Equivalently, the magnitude of the propagation constant along the guiding LHM needs to be designed to be smaller in magnitude than the propagation constant in free-space $k_0$.

A radiating LHM antenna at 15 GHz based on dual transmission lines of the type shown in FIG. 13 was created. The LHM antenna includes 16 unit cells, with each unit cell having a dimension of 4.268 mm, approximately a factor of 5 smaller than the free-space wavelength of 2 cm at 15 GHz. Thus, the antenna can be treated as an effective medium. Commercial method of moments software was used to design the layout of the antenna. The LHM was fabricated by a mask/photo-etching technique on a 20-mil thick Rogers™ RO3203 circuit board with a relative permittivity of 3. The interconnecting transmission line sections were implemented in coplanar waveguide (CPW) technology. The transmission lines include a planar center conductor with two adjacent ground planes on either side. In the coplanar waveguide configuration, both ground planes and the center conductor lie in the same plane, which allows the simple integration of shunt inductors and series capacitors. The gaps in the CPW center conductor serve as the series capacitors and the narrow lines connecting the center conductor to the coplanar ground planes act as the shunt inductors. It is in fact these capacitive gaps that radiate in the structure and cause a backward emerging transverse magnetic wavefront. On the contrary, the inductive lines are non-radiating due to the antiparallel currents flowing on each pair of inductive lines. This odd symmetry causes cancellation in the far field and leads to low cross-polarization levels.

Although there are various radiating structures that exhibit phase and group velocities of opposite sign, the proposed structure, unlike conventional structures operates in the long wavelength regime and demonstrates backward-wave radiation in its lowest passband of operation. The proposed structure supports a backward-wave fundamental spatial harmonic that radiates. Early examples of backward-wave radiating structures include the helix antenna, corrugated dielectric, or metallic surfaces, and periodic arrays of radiating elements fed by slow wave transmission line sections of large periodic spacing (d>λ/2). These structures, however, radiate in higher-order passbands (exhibit higher-order radiating spatial harmonics) and therefore, effective material constants such as a refractive index cannot in general be defined. On the other hand, log-periodic dipole arrays and related uniform dipole arrays with a transposed feed have shown to produce backward waves even for small longitudinal periodic spacings. Nevertheless, the dipoles are resonant so element dimensions still remain electrically large (~λ/2) and therefore effective material parameters, e and m cannot be defined.

Super-Lens Formed From Metamaterials and RHM

The present metamaterial is also suitable for use in a focusing device that overcomes diffraction limits, hereinafter referred to as a "super-lens". The super-lens includes two-field focusing devices of the type previously discussed and is formed by sandwiching the LHM between the two RHM at two parallel interfaces. The LHM is a planar slab having a grid of printed metallic strips over a ground plane, loaded with series capacitors C and shunt inductors L. The two RHMs are two unloaded printed grids which act as homogeneous and isotropic media with positive indices of refraction.

Figure 39:
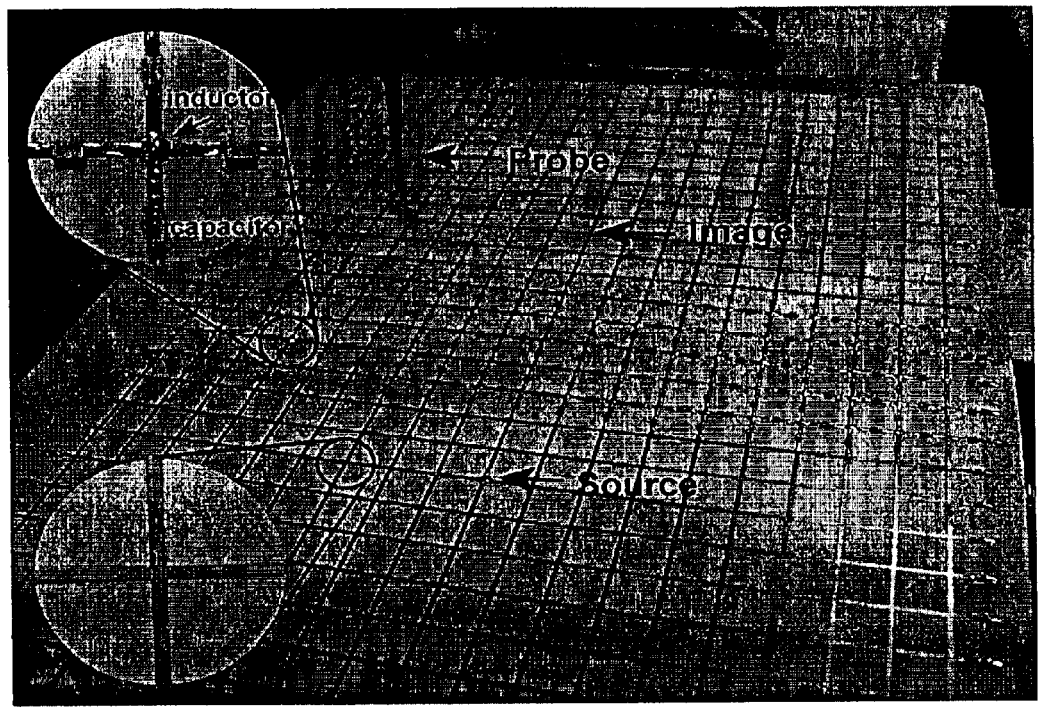
FIG. 39 shows a planar transmission-line left-handed lens.

FIG. 39 illustrates the planar transmission line left-handed super-lens. The unit cell of the left-handed grid is shown in the top insert while the unit cell of the positive refractive index grid is shown in the bottom insert. The super-lens is fabricated on a grounded microwave substrate (Rogers™ RO3003) of thickness 60 mil (1.52 mm) and dielectric constant $\epsilon_r$=3.00. The left-handed slab has a 5×19 grid of printed metallic strips (microstrip lines) loaded with series chip capacitors C and shunt chip inductors L to the ground. Each unit cell has dimensions 8.40 mm×8.40 mm and therefore is much smaller than the nominal operating wavelength of 15.59 cm at 1 GHz. Hence, the loaded periodic grid acts as an effective medium exhibiting a negative index of refraction. The left-handed planar slab is sandwiched between two commensurate unloaded printed grids that act as effective homogenous media with positive indices of refraction. The unloaded grid and ground plane behave like a dielectrically loaded parallel-plate waveguide, but in addition allow simple measurement of the guided fields through proximity coupling. The left-handed grid is designed so that it is impedance matched and exhibits a refractive index of −1 relative to the unloaded grids at the design frequency of 1.00 GHz.

The first unloaded grid is excited at a point which is imaged by the left-handed slab to the second unloaded grid, with a vertical monopole fed by a coaxial cable through the ground plane. The monopole attaches the center conductor of the coaxial cable to a point on the unloaded grid, while the outer conductor of the coaxial cable attaches to the ground plane. The vertical monopole lies along the center row (row 0), located 2.5 unit cells away from the first interface of the left-handed slab. According to geometrical optics, the source and image should be symmetrically positioned with respect to the left-handed slab. This is due to the fact that the distance from the source to the first interface (2.5 unit cells) is half the left-handed slab thickness (5 cells). The set-up shown in FIG. 39 is a practical implementation for imaging a point source from one homogeneous dielectric to another using a left-handed slab.

Figure 40:
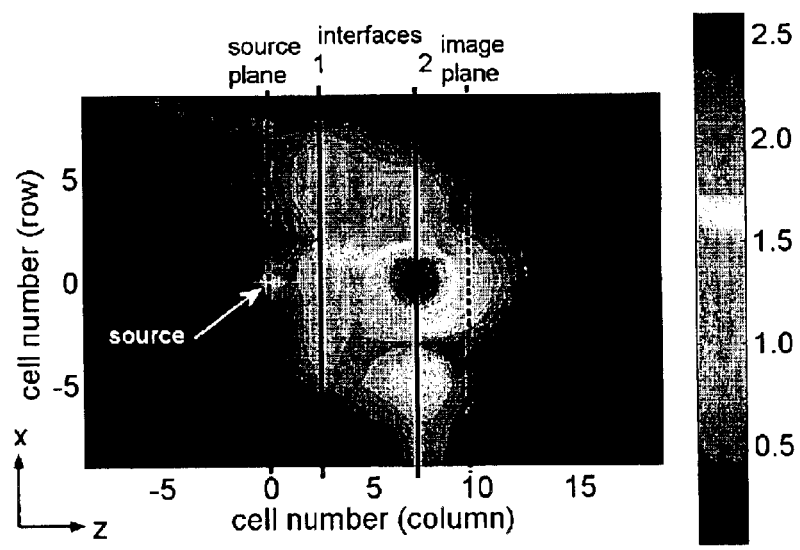
FIG. 40 shows the measured vertical electric field detected 0.8 mm above the surface of the lens of FIG. 39 at 1.057 GHz.
Figure 41:
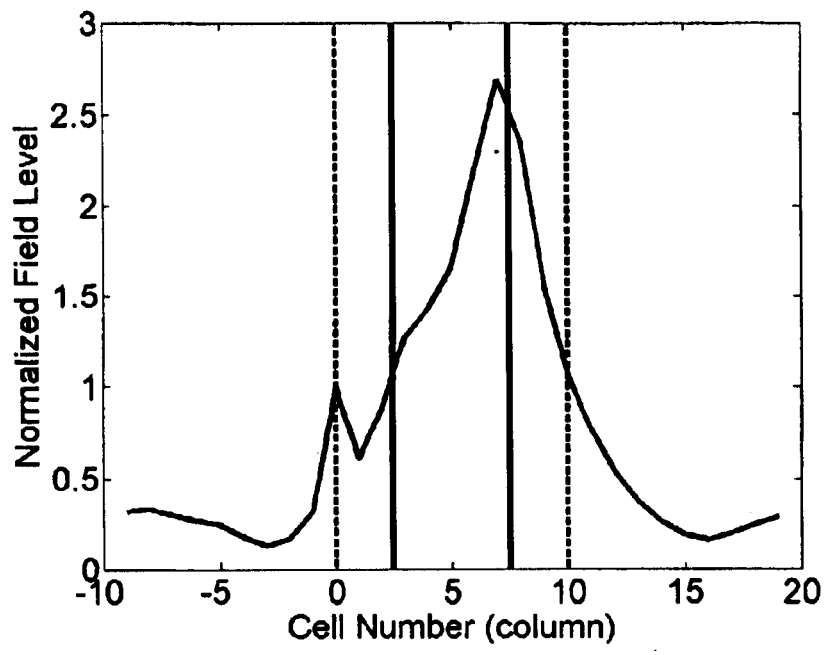
FIG. 41 shows the measured vertical electric field above row 0 of the lens of FIG. 39 at 1.057 GHz.

The vertical electric field over the entire structure is measured using a detecting probe. The field is detected 0.8 mm above the entire surface of the structure, using a short vertical probe connected to a Hewlett-Packard Vector Network Analyzer model 8753D. Port 1 of the network analyzer is connected to the coaxial cable that feeds the exciting monopole. Port 2 is connected by a separate coaxial cable to the detecting probe that is scanned above the surface of the structure using a computer-controlled stepper motor. The measured transmission coefficient is proportional to the voltage of the grid nodes with respect to the ground plane. The best focusing results were observed at 1.057 GHz, a frequency slightly higher than the design frequency of 1.00 GHz. This is primarily due to the variation of chip inductors and capacitors from their nominal values, as well as fabrication tolerances in printing the grid lines. The measured vertical electric field above each unit cell for the entire structure is shown in FIG. 40, at a frequency of 1.057 GHz. The plot is normalized with respect to the source amplitude. The source is located at (column, row)=(0,0) and the image at (10,0), whereas the first and second interfaces are located between columns 2 & 3 and 7 & 8, respectively. As shown, the enhancement of evanescent waves is quite evident at the second interface of the left-handed slab near the center row (row 0) and the results agree well with microwave-circuit simulations. FIG. 41 explicitly shows the measured electric field along row 0 to emphasize the growing evanescent fields within the left-handed lens. The vertical dashed lines identify the source at column 0 and the image at column 10 while the vertical solid lines identify the interfaces of the left-handed slab.

Figure 42:
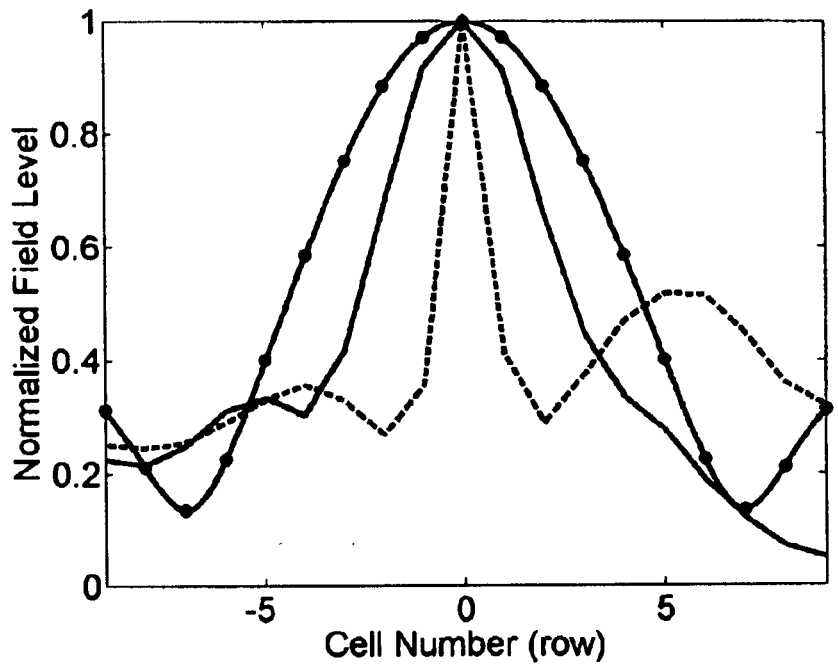
FIG. 42 shows the measured vertical electric field at the source (dashed curve) and image (solid curve) planes along with the diffraction-limited image (solid curve with circles)

Geometrical optics establish that the source and its image should be separated by twice the thickness of the slab (2×5=10 unit cells). Thus, the measured vertical electric field along the image column (column 10) is shown in FIG. 42. Plotted in the same Figure are the measured transverse patterns at the source column (column 0), as well as the theoretical diffraction-limited pattern. All patterns in FIG. 42 are normalized to unity for comparison purposes. Nevertheless, the measured source and image peaks lie within 7% of each other. In addition, it is important to explain how the theoretical diffraction-limited pattern was computed. Due to the close proximity (0.54 effective wavelengths) of the source and its image, evanescent waves that reach the image should be accounted for. For this reason, the diffraction-limited pattern assumes that the propagating components are focused whereas the evanescent components are not neglected, but rather assumed to exponentially decay from the source to the image, with attenuation factors corresponding to a refractive index of n=+1. Expressions for the voltage (V) at the image plane (column 10) are given by the integral in equation 41 below:

$$V(x) = C \int_{-\infty}^{\infty} \frac{e^{ik_{z1}D} e^{ik_{z2}D} e^{ik_x x}}{k_{z1}} dk_x \quad (41)$$

$k_{z1}=-k_{z2}=\sqrt{k_o^2-k_x^2}$ for $k_x<k_o$ (propagating waves)

$k_{z1}=k_{z2}=i\sqrt{k_x^2-k_o^2}$ for $k_x>k_o$ (evanescent waves)

where:
C is a constant that normalizes V(0)=1;
D is the width of the lens; and
$k_o$ is the intrinsic wavenumber in all grid media.

The half-power beamwidth of the diffraction-limited image shown in FIG. 42 is 129 degrees. It was found that the diffraction-limited image including attenuating evanescent waves and the image neglecting them altogether are almost identical.

With this clarification in mind, a comparison of the images shown in FIG. 42 can be made. Clearly, the measured image pattern is narrower than the theoretical diffraction-limited one. The measured half-power beamwidth is 75 degrees. This is significantly narrower than the 129 degrees for the diffraction-limited image. This establishes that it is possible to overcome the diffraction limit when imaging from one homogeneous dielectric to another through a left-handed isotropic lens. This narrowing of the beamwidth beyond the diffraction limit can be ascribed to the enhancement of the evanescent waves evident in FIGS. 39 and 40. Nevertheless, the image is still imperfect since the source beamwidth is narrower than that of the image. This is not surprising considering that slight material losses and mismatches at the lens interfaces lead to departures from the n=−1 condition and thus, degrade the ability of a left-handed lens to achieve perfect imaging.

Resonance Cone Antenna

Figure 43:
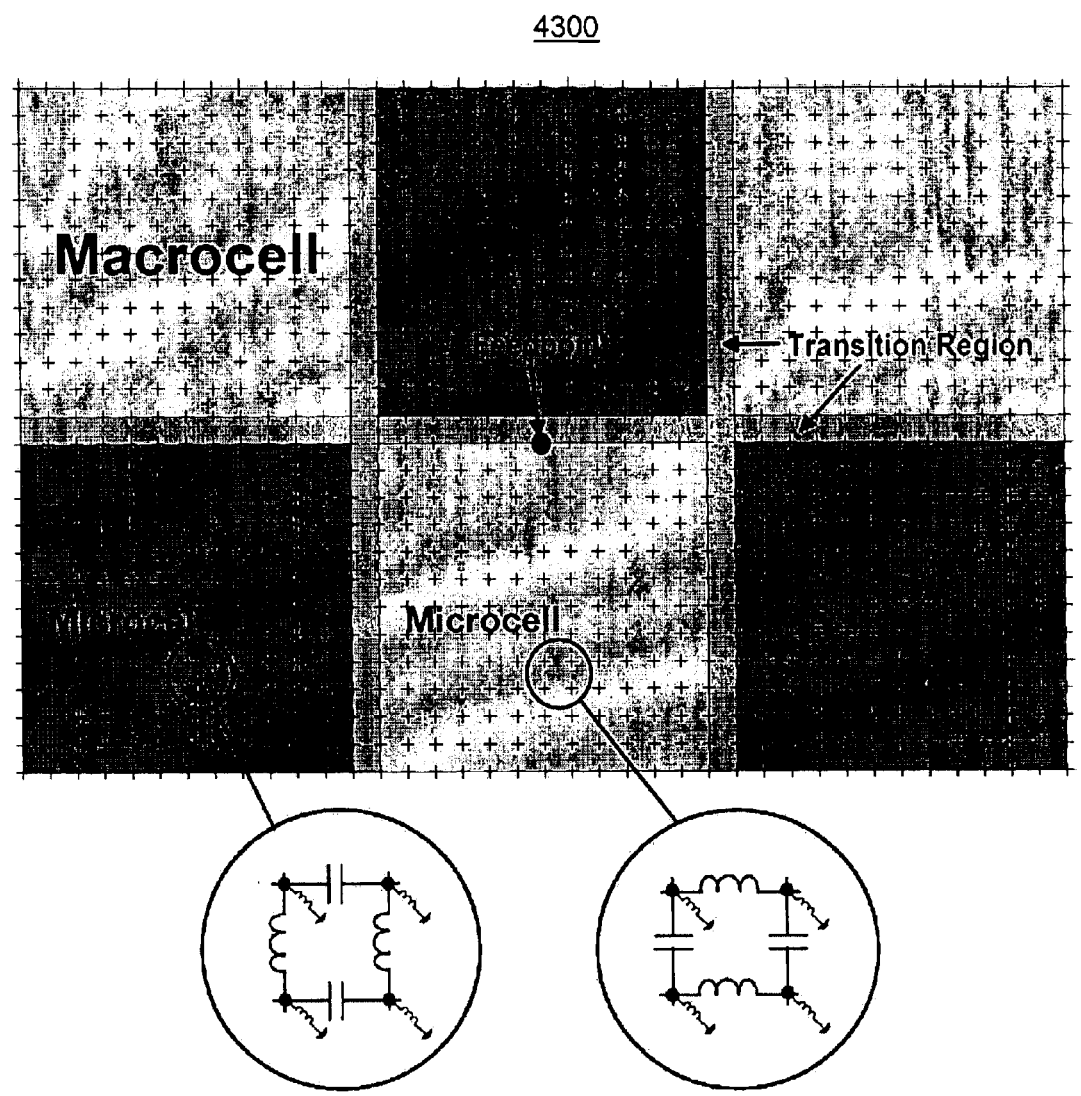
FIG. 43 shows an antenna formed of 6 macrocells of resonance cone metamaterial.

Resonance cone metamaterial may also be used in an antenna, by shunting the metamaterial with inductors, at the transmission line intersections. FIG. 43 shows a resonance cone antenna 4300 constructed using metamaterial. The antenna includes a 2×3 array of macrocells. Each macrocell includes a plurality of microcells of orthogonal pairs of transmission line segments joined in a substantially rectangular fashion. The segments are loaded periodically with lumped capacitors in one direction and lumped inductors in a perpendicular direction. The microcells of the macrocells have a shared orientation that is different from the orientation of microcells in adjacent macrocells by 90 degrees. Macrocells are joined by transition regions similar to those described previously with reference to the focusing device. The transmission line segments of the transition regions include both lumped capacitors and inductors arranged in a manner consistent with FIG. 24. The device input, or feed point, is located at the transition region adjacent the center of the macrocell array.

Figure 44:
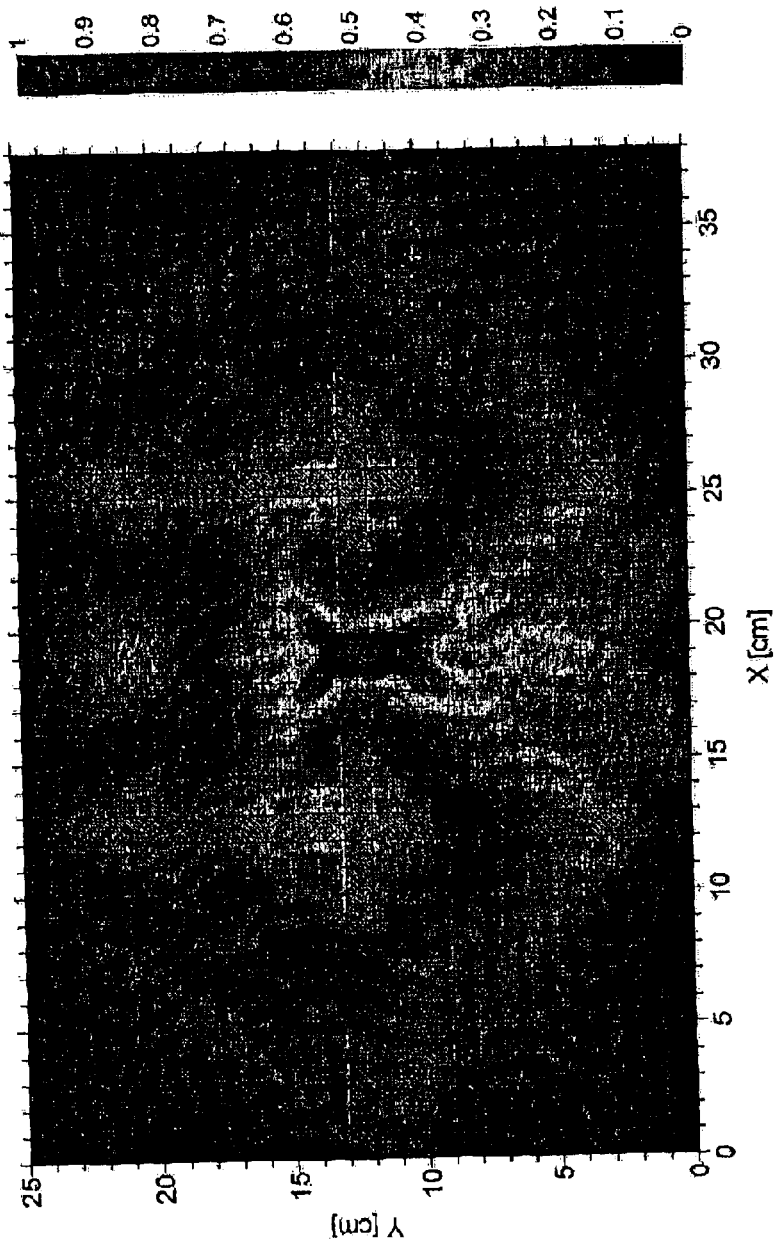
FIGS. 44 and 45 show the grid-to-ground voltage of a six cell antenna operating at 1 $GH_z$ and the resulting radiation pattern.
Figure 45:
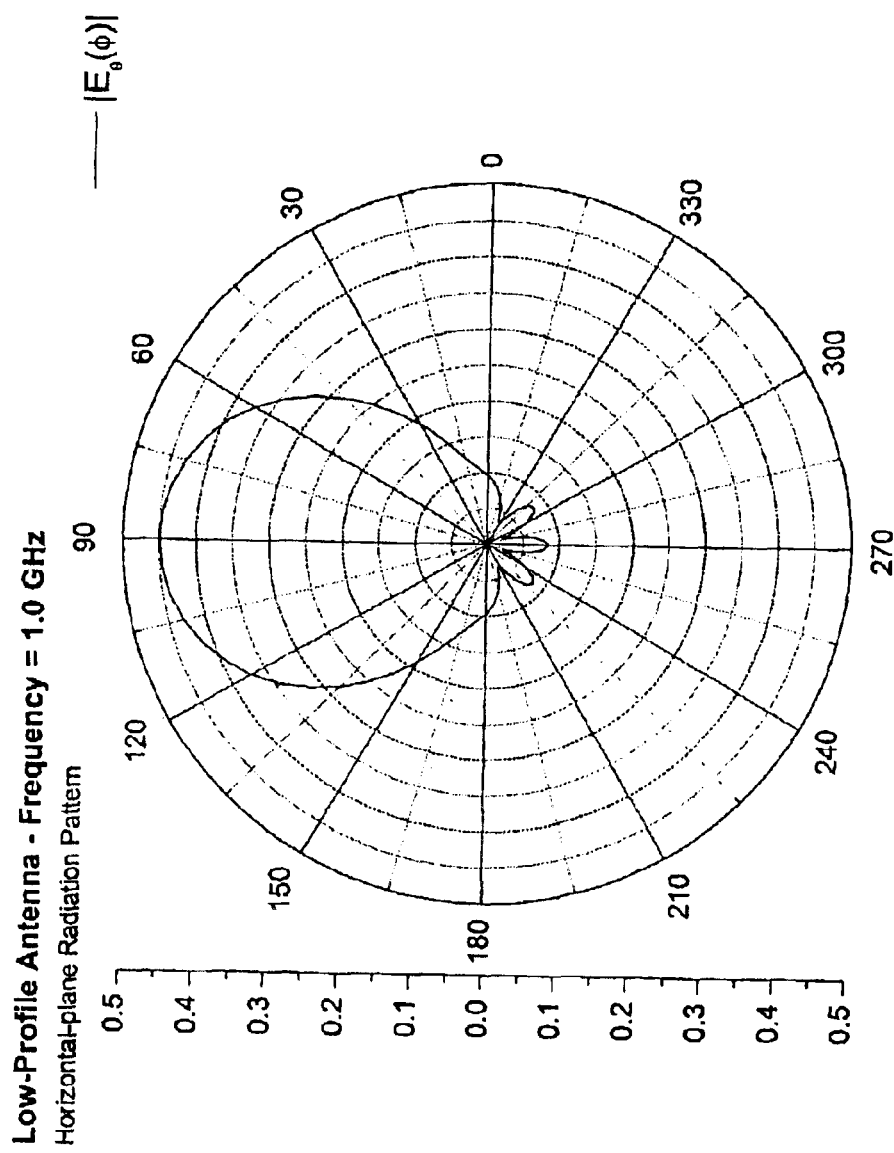

This arrangement of metamaterials, and input location allows input waves of compatible wavelength, to form a resonance cone patern of two squares that are multi-refracted within the macrocell array. This gives radiation patterns that can be close to the ground plane or elevated, but do not suffer from unwanted edge interactions as shown in FIGS. 44 and 45. Moreover, as the frequency departs from the design cone value, the resonance cone squares turn into expanding or contracting square spirals that become weak before reaching the grid edges due to radiation or ohmic losses. This phenomenon is inherently non-resonant which leads to broadened operating bandwidths as compares to patch antennas over ground.

As will be appreciated it has been shown that negative refraction and focusing of electromagnetic waves can be achieved in metamaterials that support backward waves without employing resonances or directly synthesizing the permittivity and permeability. Schemes for fabricating such media by appropriately loading a host transmission line medium have also been described. The resulting planar topology permits LHM structures to be readily integrated with conventional planar microwave circuits and devices and used in a variety of applications to guide and control electromagnetic radiation.

Although preferred embodiments of the present invention have been described, those of skill in the art will appreciate that variations and modifications may be made without departing from the spirit and scope thereof as defined by the appended claims.

What is claimed is:

1. A planar metamaterial comprising:
   two substantially orthogonal, coplanar sets of transmission lines, said transmission lines being spaced with a periodicity, loaded with capacitors with said periodicity, and shunted with inductors with said periodicity such that for an electromagnetic wave having a wavelength greater than said periodicity and traveling along the plane of said transmission lines, an effective permeability and permittivity of said metamaterial are simultaneously negative.

2. A planar metamaterial according to claim 1 wherein the wavelength of said electromagnetic wave is greater than said periodicity by an order of magnitude.

3. A linear metamaterial comprising:
   a transmission line, having a linear dimension, and being loaded with capacitors, and shunted with an inductor such that for an electromagnetic wave having a wavelength greater than said linear dimension and traveling along the axis of said transmission line, an effective permeability and permittivity of said metamaterial are simultaneously negative.

4. A planar metamaterial according to claim 3 wherein the wavelength of said electromagnetic wave is greater than said periodicity by an order of magnitude.

5. A metamaterial according to claim 4 wherein the values of said capacitors and inductor are proportioned to provide a continuous passband for said electromagnetic wave.

6. A metamaterial according to claim 4 wherein said transmission line includes two substantially identical capacitors on either side of said inductor.

7. A metamaterial according to claim 4 further comprising a plurality of substantially identical transmission lines arranged in series.

8. A metamaterial according to claim 7 wherein each transmission line includes two substantially identical capacitors on either side of said inductor.

9. A metamaterial according to claim 8 wherein the values of said capacitors and inductor are proportioned to provide a continuous passband for said electromagnetic wave.

10. A planar resonance cone metamaterial comprising:
    a first set of transmission lines, spaced with a periodicity, and loaded with capacitors with said periodicity;
    a second set of transmission lines, substantially orthogonal and coplanar with said first set of transmission lines, said second set of transmission lines being spaced with said periodicity, and loaded with inductors with said periodicity, said first and second sets of transmission lines exhibiting characteristics such that for an electromagnetic wave having a wavelength greater than said periodicity by an order of magnitude, and traveling along the linear axis of said first set of transmission lines, an effective permittivity of said metamaterial is positive such that for an electromagnetic wave having a wavelength greater than said periodicity by an order of magnitude and traveling along the linear axis of said second set of transmission lines, the effective permittivity of said metamaterial is negative.

11. A metamaterial according to claim 10 further comprising an input on the perimeter of said metamaterial coincident with an intersection of one transmission line of said first set and one transmission line of said second set and a plurality of outputs on the perimeter of said metamaterial coincident with intersections of transmission lines of said first and second sets.

12. A planar resonance cone metamaterial comprising:
    a first set of transmission lines, spaced with a first periodicity, and loaded with capacitors with a second periodicity;
    a second set of transmission lines, substantially orthogonal and coplanar with said first set of transmission lines, said second set of transmission lines being spaced with said second periodicity, and being loaded with inductors with said first periodicity whereby for an electromagnetic wave having a wavelength greater than said first and second periodicities by an order of magnitude and traveling along the longitudinal axis of said first set of transmission lines, an effective permittivity of said metamaterial is positive and for an electromagnetic wave having a wavelength greater than said first and second priodocities and traveling along the longitudinal axis of said second set of transmission lines, the effective permittivity of said metamaterial is negative.

13. A near field focusing device comprising:
    a first set of transmission lines, said first set of transmission lines being spaced with a first periodicity and loaded with capacitors with a second periodicity;
    a second set of transmission lines, substantially orthogonal to, and coplanar with said first set of transmission lines, said second set of transmission lines being spaced with said second periodicity, loaded with capacitors with said first periodicity, and shunted with inductors, said first set of transmission lines intersecting said second set of transmission lines such that for an electromagnetic wave having a wavelength greater than said first or second periodicity by an order of magnitude, and traveling along the plane of said transmission lines, an effective permeability and permittivity of said metamaterial are simultaneously negative; and a planar waveguide having a flat extent, coupled to said transmission lines, such that said flat extent is parallel to one set of transmission lines.

14. A phase-shifting device comprising:

a transmission line, having a linear dimension and characteristic impedance;

capacitors loaded on said transmission line; and an inductor shunting said transmission line, said transmission line exhibiting characteristics such that for an electromagnetic wave having a wavelength greater than said linear dimension by an order of magnitude and traveling along the axis of said transmission line, an effective permeability and permittivity of transmission are simultaneously negative and such that said transmission line provides a continuous passband for said electromagnetic wave along said transmission line.

15. A phase-shifting device according to claim 14 further comprising a plurality of transmission lines coupled in series.

16. A phase-shifting-device according to claim 15 wherein each transmission line includes a pair of identical capacitors on either side of said inductor.

17. A near field focussing device comprising:

a parallel-plate waveguide; and a negative refractive index metamaterial in line with said waveguide and forming an interface therewith.

18. A focussing device according to claim 17 wherein said waveguide serves as a right-handed medium, electromagnetic radiation passing through said interface from said waveguide being focussed in said metamaterial.

* * * * *